United States Patent
Goidas et al.

(10) Patent No.: US 9,262,657 B2
(45) Date of Patent: *Feb. 16, 2016

(54) RADIO FREQUENCY IDENTIFICATION TAG IDENTIFICATION SYSTEM

(71) Applicant: Datalogic Automation, Inc., Telford, PA (US)

(72) Inventors: Peter J. Goidas, Lansdale, PA (US); Zhong-Min Liu, Doylestown, PA (US); Jeffrey M. Brockmole, Brighton, MI (US); Kapilkumar N. Kulakkunnath, Colmar, PA (US)

(73) Assignee: DATALOGIC AUTOMATION, INC., Telford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,718

(22) Filed: Oct. 6, 2014

(65) Prior Publication Data

US 2015/0091701 A1    Apr. 2, 2015

Related U.S. Application Data

(63) Continuation of application No. 12/749,870, filed on Mar. 30, 2010, now Pat. No. 8,854,212.

(60) Provisional application No. 61/164,862, filed on Mar. 30, 2009.

(51) Int. Cl.
*H04Q 5/22* (2006.01)
*G08B 13/14* (2006.01)
(Continued)

(52) U.S. Cl.
CPC .......... *G06K 7/10316* (2013.01); *H01Q 1/2216* (2013.01); *H01Q 21/065* (2013.01); *H01Q 21/08* (2013.01); *H01Q 21/24* (2013.01); *G06K 7/10435* (2013.01)

(58) Field of Classification Search
CPC ... G06Q 10/087; G06Q 10/08; H01Q 1/2216; H01Q 21/065; H01Q 1/22; G01S 13/878; G01S 5/04; G06K 19/0723; G06K 7/0008; G06K 7/10435; G06K 7/10336; G06K 2017/0045; G06F 21/34; H04Q 2209/47; H04Q 2209/75
USPC ............ 340/572.1, 572.7, 572.4, 10.1, 572.3, 340/928, 551, 572.9, 505, 506, 539.13; 343/742, 866, 745, 748, 893, 726, 855; 235/385, 384, 375, 382; 705/22
See application file for complete search history.

(56) References Cited

U.S. PATENT DOCUMENTS 3,094,695 A    6/1963   Jahn
3,295,134 A    12/1966  Lowe
(Continued)

FOREIGN PATENT DOCUMENTS

EP    0091581    10/1983
EP    0135049    3/1985
(Continued)

*Primary Examiner* — Mirza Alam
(74) *Attorney, Agent, or Firm* — Nelson Mullins Riley & Scarborough, LLP

(57) ABSTRACT

A conveyor system for processing items on which radio frequency identification tags are disposed has a conveyor that conveys items through a path of travel, and an antenna disposed proximate the path of travel. Circuitry in communication with the antenna may associate RFID tag data with a package on the conveyor based on a difference signal from elements in the antenna.

14 Claims, 22 Drawing Sheets

(51) Int. Cl.
  *H04K 3/00*      (2006.01)
  *G06K 7/10*      (2006.01)
  *H01Q 1/22*      (2006.01)
  *H01Q 21/06*     (2006.01)
  *H01Q 21/08*     (2006.01)
  *H01Q 21/24*     (2006.01)

(56) References Cited

U.S. PATENT DOCUMENTS

| | | | |
|---|---|---|---|
| 3,747,100 | A | 7/1973 | Gulick, Jr. |
| 4,214,244 | A | 7/1980 | McKay et al. |
| 4,471,344 | A | 9/1984 | Williams |
| 4,525,716 | A | 6/1985 | Carlin |
| 4,529,988 | A | 7/1985 | James et al. |
| 4,893,129 | A | 1/1990 | Kodera et al. |
| 5,005,001 | A | 4/1991 | Cordery |
| 5,126,749 | A | 6/1992 | Kaltner |
| 5,210,541 | A | 5/1993 | Hall et al. |
| 5,369,412 | A | 11/1994 | Tsujimoto |
| 5,686,928 | A | 11/1997 | Pritchett et al. |
| 5,881,886 | A | 3/1999 | Lawandy |
| 5,929,760 | A | 7/1999 | Monahan |
| 5,943,017 | A | 8/1999 | Cosenza et al. |
| 5,995,048 | A | 11/1999 | Smithgall et al. |
| 6,184,841 | B1 | 2/2001 | Shober et al. |
| 6,218,942 | B1 | 4/2001 | Vega et al. |
| 6,259,413 | B1 | 7/2001 | Schmidt et al. |
| 6,288,677 | B1 | 9/2001 | Fink |
| 6,320,542 | B1 | 11/2001 | Yamamoto et al. |
| 6,392,544 | B1 | 5/2002 | Collins et al. |
| 6,473,054 | B1 | 10/2002 | Lopez et al. |
| 6,538,603 | B1 | 3/2003 | Chen et al. |
| 6,771,216 | B2 | 8/2004 | Patel et al. |
| 6,943,688 | B2 | 9/2005 | Chung et al. |
| 7,004,399 | B2 | 2/2006 | Maeda et al. |
| 7,053,775 | B2 | 5/2006 | Moore |
| 7,088,248 | B2 | 8/2006 | Forster |
| 7,170,412 | B2 | 1/2007 | Knox et al. |
| 7,183,922 | B2 | 2/2007 | Mendolia et al. |
| 7,187,288 | B2 * | 3/2007 | Mendolia ............ G01S 5/04 340/572.1 |
| 7,195,159 | B2 | 3/2007 | Sloan et al. |
| 7,221,269 | B2 | 5/2007 | Onderko et al. |
| 7,323,996 | B2 | 1/2008 | Mullins |
| 7,538,675 | B2 | 5/2009 | Hillegass |
| 7,576,655 | B2 | 8/2009 | Liu |
| 7,589,635 | B2 | 9/2009 | Liu |
| 2002/0030587 | A1 | 3/2002 | Jackson |
| 2002/0084945 | A1 | 7/2002 | Huebner |
| 2003/0184477 | A1 | 10/2003 | Shafai et al. |
| 2004/0070503 | A1 * | 4/2004 | Monahan ........ G06K 7/10336 340/572.7 |
| 2005/0110674 | A1 | 5/2005 | Mendolia et al. |
| 2005/0156039 | A1 | 7/2005 | Carrender et al. |
| 2005/0159187 | A1 | 7/2005 | Mendolia et al. |
| 2005/0212660 | A1 | 9/2005 | Hansen et al. |
| 2005/0212673 | A1 * | 9/2005 | Forster ............ G06K 7/0008 340/572.7 |
| 2005/0285742 | A1 | 12/2005 | Charych et al. |
| 2006/0012465 | A1 | 1/2006 | Lee et al. |
| 2006/0033607 | A1 | 2/2006 | Bellantoni |
| 2006/0250253 | A1 * | 11/2006 | Liu ..................... 340/572.7 |
| 2007/0030150 | A1 | 2/2007 | Mullins |
| 2007/0075866 | A1 * | 4/2007 | Hohler ............ G06K 7/10336 340/572.7 |
| 2007/0185613 | A1 * | 8/2007 | Feldenzer ........... G06Q 10/087 700/225 |
| 2009/0251286 | A1 * | 10/2009 | Black et al. ............ 340/10.1 |
| 2012/0218081 | A1 * | 8/2012 | Blake et al. ........... 340/10.1 |

FOREIGN PATENT DOCUMENTS

| | | |
|---|---|---|
| EP | 1612579 | 1/2006 |
| EP | 1628238 | 2/2006 |
| JP | 11088208 | 3/1999 |
| JP | 11154250 | 6/1999 |
| JP | 2003283367 | 10/2003 |
| WO | WO94 14143 | 6/1994 |
| WO | WO 2005116680 | 12/2005 |

* cited by examiner

RADIO FREQUENCY IDENTIFICATION TAG IDENTIFICATION SYSTEM

CROSS-REFERENCE TO RELATED APPLICATIONS

This application is a continuation of U.S. patent application Ser. No. 12/749,870, filed Mar. 30, 2010, now U.S. Pat. No. 8,854,212, which claims the benefit of U.S. provisional patent application Ser. No. 61/164,862 entitled "Radio Frequency Identification Tag Identification System" and filed on Mar. 30, 2009, the entire disclosures of which are hereby incorporated by reference as if set forth verbatim herein and relied upon for all purposes.

FIELD OF THE INVENTION

The present invention relates to radio frequency tag identification systems and, in particular, to systems and methods that associate information with packages traveling on a conveyor based on signals transmitted by radio frequency identification tags and received by system antennas.

BACKGROUND OF THE INVENTION

Tracking and distribution systems employ various arrangements of conveyor belts and associated components to move items along a predefined route in order to transport items to desired end locations. Item tracking systems in commercial settings may use barcode labels to identify, track, and direct these items throughout the system. Barcode labels, however, require an unobstructed and direct line of sight between the barcode reader and barcode label. The orientation, shape, and size of packages bearing barcode labels can complicate the ability of the barcode reader to read the barcode label. In contrast, radio frequency identification ("RFID") tags do not require an unobstructed and direct line of sight between an antenna that transmits and receives radio frequency ("RF") signals and the RFID tag, and it is known to employ RF readers in conveyor tracking systems to identify and track items moved by the conveyor bearing RFID tags.

Generally, in such an RFID system, a number of RF antennas are situated alongside, above, and/or below the conveyor belt to read RFID tags located on the various sides of packages as the packages travel along the conveyor path. A photodetector or other sensing device detects the front of a package, which triggers the system to initiate and store a package record in the system memory. The sensor's position in the conveyor path is known, and the tracking system uses this information, in combination with output data from a tachometer that corresponds to the conveyor's movement, to track the location of each package as it travels along the conveyor path between the sensor and a predefined point downstream from the sensor.

For each antenna in the system, an RF engine (separate engines may be used for the antennas, or the antennas may share a common engine) supplies a drive signal to the antenna, which radiates an electromagnetic field in response to the signal. The antenna transmits interrogation signals capable of activating RFID tags affixed to packages that pass through the electromagnetic field and receives backscattered data signals from activated tags located within or passing through the radiated field. Depending on the rate at which the antenna system sends and receives signals to and from the RFID tag, the RF tracking system may receive a signal from a given RFID tag multiple times before the tag exits the electromagnetic fields radiated by the system's antennas. The tracking system may define a predetermined area along the conveyor within the area covered by the electromagnetic field radiated by the antenna, where, if the system receives a signal from an RFID tag when a package is within the predetermined area, the system assigns the tag data from the signal to the package record corresponding to that package.

There can be uncertainty, however, in determining the correct package to which an RFID tag corresponds relying solely on the package's position in the area at the time signals are received from the tag. Since the radiated field lacks specific, defined boundaries, it can be possible that a given response may have been received from an RFID tag affixed to any of multiple packages within the predetermined area or to a package located outside the predetermined area. Thus, it may be difficult to assign specific RFID tag data to a particular package when two or more packages are simultaneously located within, or in close proximity to, the predetermined area at the time the signal was received. Systems may assign an RFID tag to a given package when the system reads the tag more times when that package is within the predetermined area than when packages upstream are in the predetermined area.

SUMMARY OF THE INVENTION

The present invention recognizes and addresses the foregoing considerations, and others, of prior art construction and methods.

In one embodiment of the present invention, a conveyor system for processing items on which radio frequency identification tags are disposed comprises a conveyor that conveys items through a path of travel, each item having at least one respective radio frequency identification tag disposed thereon. A sensor is disposed proximate the path of travel so that the sensor detects presence of items in the path of travel. Circuitry in communication with the sensor and the conveyor tracks a position of each item with respect to the path of travel. An antenna is disposed proximate the path of travel so that the antenna radiates radio frequency signals into the path of travel, including to a predetermined position in the path of travel. The antenna comprises at least one first element and at least one second element that radiate the radio frequency signals and that receive responses to the radio frequency signals from radio frequency identification tags disposed on the items being conveyed by the conveyor through the path of travel. The at least one first element is disposed upstream from the at least one second element with respect to the path of travel. The circuitry receives signals from the at least one first element and the at least one second element corresponding to the responses and provides output signals in response to the responses. For respective responses, a magnitude of an output signal corresponds to a difference between magnitude of a signal from one of the at least one first element and the at least one second element corresponding to the response and magnitude of a signal from the other of the at least one first element and the at least one second element corresponding to the response. The antenna is disposed with respect to the path of travel so that the magnitude of the output signals is at a minimum when the radio frequency identification tag from which the at least one first element and the at least one second element receive the responses is at the predetermined position. The circuitry is configured to monitor the output signals and to associate information corresponding to a radio frequency identification tag with an item based upon proximity of the item to the predetermined position when the magnitude of the output signals reach the minimum.

In another embodiment, a conveyor system for processing items on which radio frequency identification tags are disposed comprises a conveyor that conveys items through a path of travel, each item having at least one respective radio frequency identification tag disposed thereon. An antenna disposed with respect to the path of travel radiates radio frequency signals into a first area through which the items pass. The antenna comprises a substrate and a plurality of patch elements having respective generally planar surfaces and that are disposed on the substrate in respective positions that are sequential with respect to a direction transverse to the path of travel. The generally planar surfaces of the patch elements are generally coplanar. The antenna includes a feed network that applies respective signals to each patch element that drive electric current at the patch elements to radiate the radio frequency signals. The respective signals applied by the feed network to at least two patch elements define a predetermined phase shift of approximately 79 degrees with respect to each other that is fixed so that respective electric current patterns on the at least two patch elements are out of phase with respect to each other. A radio frequency transmitter drives the antenna to emit the radio frequency signals into the first area.

In a still further embodiment, a conveyor system for processing items on which radio frequency identification tags are disposed comprises a conveyor that conveys items through a path of travel, each item having at least one respective radio frequency identification tag disposed thereon. An antenna disposed with respect to the path of travel radiates radio frequency signals into a first area through which the items pass. The antenna comprises a substrate and a plurality of patch elements having respective generally planar surfaces. The generally planar surfaces of the patch elements are generally coplanar. The antenna includes a feed network that applies respective signals to each patch element that drive electric current at the patch elements to radiate the radio frequency signals. A radio frequency transmitter drives the antenna to emit the radio frequency signals into the first area. The feed network comprises a switch that selectively connects at least one of the patch elements to the transmitter over a first feed line in a first position of the switch and a second feed line in a second position of the switch. The first feed line and the second feed line define a relative difference in length with respect to frequency of the signals applied to the patch elements so that a predetermined difference in phase is defined between the radio frequency signals radiated by the at least one of the patch elements when the switch is in the first position and the radio frequency signals radiated by the at least one of the patch elements when the switch is in the second position.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1A:
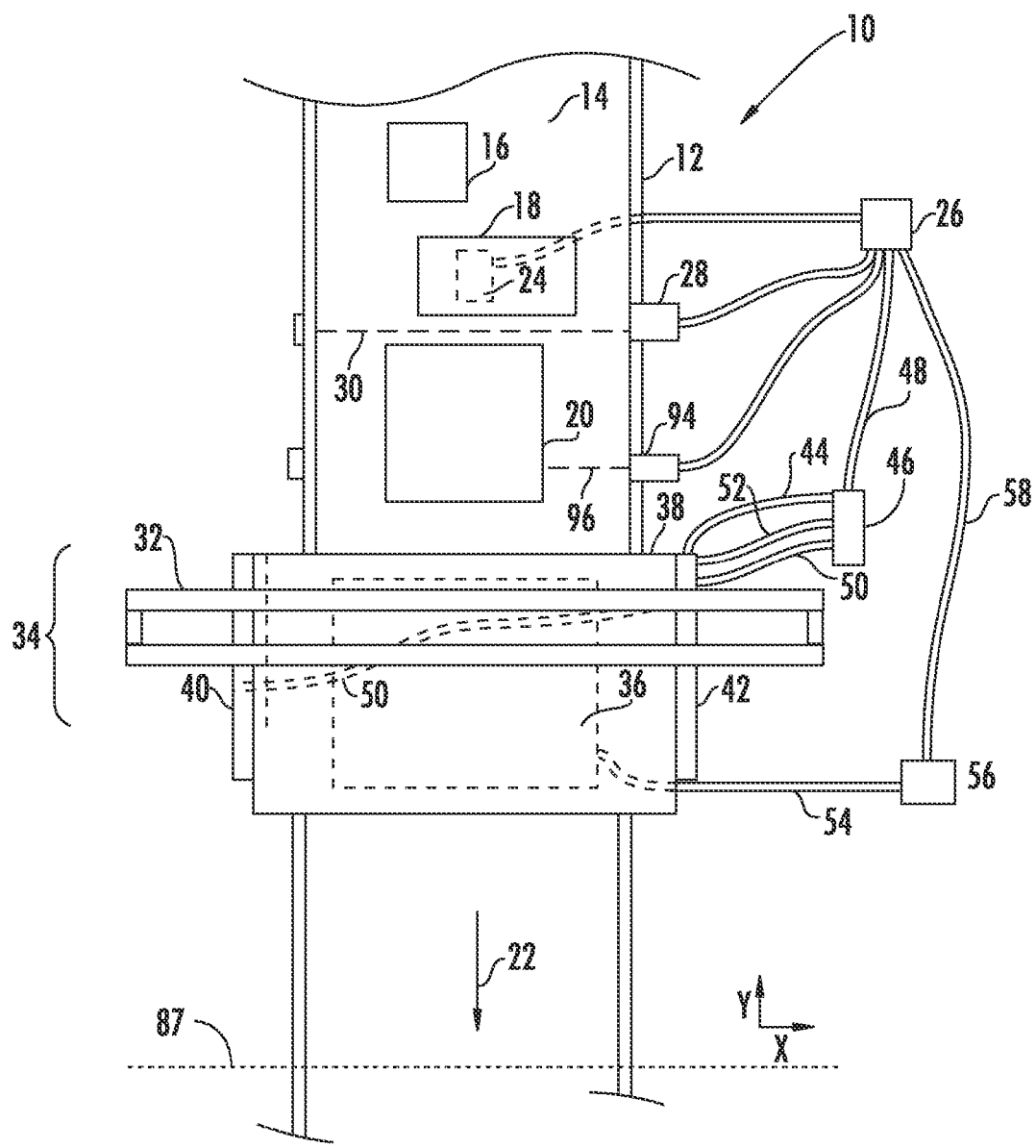
FIG. 1A is a schematic representation of a conveyor system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1A, a conveyor system 10 may have a conveyor belt 14 attached to a conveyor frame 12 that moves items (for example, packages exemplified in the illustrated embodiment at 16, 18, and 20) along a path of travel in a direction denoted by arrow 22 from an upstream (with respect to direction 22) location toward a downstream (with respect to direction 22) location. Conveyor system 10 may include a tachometer ("TAC") 24 disposed beneath and in contact with moving conveyor belt 14 and operatively connected to a computer 26. As TAC 24 rotates with the movement of belt 14, it outputs a signal to computer 26 comprising a series of pulses that correspond to the conveyor belt's linear movement and speed. Computer 26 receives the pulses and increments a counter in response. In one embodiment, the counter resets to zero whenever there occurs a condition in which no packages are present between the photodetector and the transmit point (discussed below), thereby preventing the counter from incrementing to a point at which the counter rolls over while packages are within the system. A photodetector 28, attached to conveyor frame 12 and connected to computer 26, produces a beam 30 transverse to the conveyor belt's direction of movement 22.

In general, the number of pulses output by TAC 24 corresponds to the linear distance traveled by the belt 14, while the tachometer's pulse frequency corresponds to the belt's speed. The number of tachometer pulses per unit of measurement defines the tachometer's resolution and its ability to precisely measure the distance that conveyor belt 14 has moved over a given period of time. TAC 24, and other devices that provide signals corresponding to the movement of conveyor belts and from which speed and specific locations along the belt can be identified and used to track objects transported by the conveyor system, should be well understood by those of ordinary skill in the art. TAC 24 may be replaced by a shaft encoder, for example, if measurements less accurate than those of a tachometer are acceptable.

As described in more detail below, information received from TAC 24 and photodetector 28 allows computer 26 to identify the specific location of items, such as packages 16, 18, and 20, along conveyor system 10 as they are transported by conveyor belt 14. Additionally, computer 26 stores a value for each component along conveyor belt 14, such as for each of the antennas described below, representing the distance, as measured in tachometer pulses, along the conveyor belt between beam 30 and the component or a space, area, or line representative of the component. In conjunction with an electromagnetic field radiated by a radio frequency ("RF") antenna, and responses to that field from RF identification ("RFID") tags, this information may be used to locate a given RFID tag on a given package traveling on the conveyor.

An antenna frame 32 may be disposed on conveyor frame 12 at a predetermined distance downstream from photodetector 28. As described in more detail below, antenna frame 32 defines an RFID antenna tunnel 34 through which packages 16, 18, and 20 travel for detection of RFID tags disposed on the packages. Very generally, the tunnel may be defined by a bottom antenna 36, a top antenna 38, and a pair of side antennas 40 and 42, each of which radiates an electromagnetic field extending from the respective antenna towards an area above belt 14 through which the packages travel. The electromagnetic field radiated by the respective antenna may also be referred to as the antenna's radiation pattern.

Top antenna 38 is positioned on frame 32 at the top of RFID antenna tunnel 34 so that the antenna is disposed directly above conveyor frame 12. The top antenna spans transversely across the path of belt 14 such that a plane defined by the antenna's face is parallel to a plane defined by the belt. A communication line 44 operatively connects top antenna 38 to an antenna engine 46 that is operatively connected to computer 26 via another communication line 48.

Side antenna 40 is positioned on frame 32 on the left side of RFID antenna tunnel 34 and is laterally offset from conveyor belt 14 such that a plane defined by the antenna's face is approximately perpendicular to a plane defined by conveyor belt 14 (assuming belt 14 to be completely planar). Side antenna 40 is positioned at a height on the left side of RFID antenna tunnel 34 such that a bottom surface of antenna 40 is above the plane defined by conveyor belt 14. A communication line 50 operatively connects side antenna 40 to antenna engine 46.

Side antenna 42 is positioned on frame 32 on the right side of RFID antenna tunnel 34 directly opposite side antenna 40 and laterally offset from conveyor belt 14 such that a plane defined by the antenna's face is parallel to (and on the opposite side of the conveyor from) the plane defined by the face of side antenna 40. Side antenna 42 is otherwise positioned at the same height on RFID antenna tunnel 34, and at the same distance from the center line of conveyor belt 14, as side antenna 40. A communication line 52 operatively connects side antenna 42 to antenna engine 46.

Bottom antenna 36 is disposed in a horizontal plane beneath conveyor belt 14 so that the antenna's radiation pattern extends upward above the belt's surface. Bottom antenna 36 is positioned between side antennas 40 and 42 and below top antenna 38. A communication line 54 operatively connects bottom antenna 36 to a separate antenna engine 56 that is operatively connected to computer 26 via another communication line 58.

The construction and operation of bottom antenna 36 and related engine 56 are described in more detail below with respect to FIGS. 2 through 4. The construction and operation of antennas 38, 40, and 42 are identical to each other and are, therefore, described in more detail below with respect to side antenna 40 and engine 46 only, with respect to FIGS. 5A, 5B, 6A, and 6B. In the presently described embodiment, antennas 38, 40, and 42 are connected to a single engine (46) as described above, but it should be understood from the explanation that follows that, in another embodiment, each antenna may be connected to a separate antenna engine, for example as described in commonly owned U.S. patent application 60/773,634, entitled RFID CONVEYOR SYSTEM AND METHOD and filed Feb. 12, 2006, U.S. patent application 60/666,938 entitled CONVEYOR SYSTEM AND METHOD and filed Mar. 29, 2005, and U.S. patent application Ser. No. 11/388,145, entitled RFID CONVEYOR AND METHOD and filed Mar. 22, 2006, the entire disclosure of each is hereby incorporated by reference for all purposes as if set forth verbatim herein. In the illustrated embodiment, antennas 36, 38, 40, and 42 are antennas incorporating patch elements that transmit and receive radio frequency signals in the range of 902 MHz to 928 MHz, as explained in more detail below.

Particularly in an embodiment in which a respective one of four engines drives each respective antenna, the engine may be built into the antenna housing, so that communication lines 44, 50, 52, and 54 are internal to the respective antenna. Furthermore, in this embodiment or in the embodiment of FIG. 1A, the communication lines between computer 26 and the engines (lines 48 and 58 in FIG. 1A) may be Ethernet connections, and power may be supplied to the engines from the computer over the Ethernet lines, as described in more detail below.

Figure 1B:
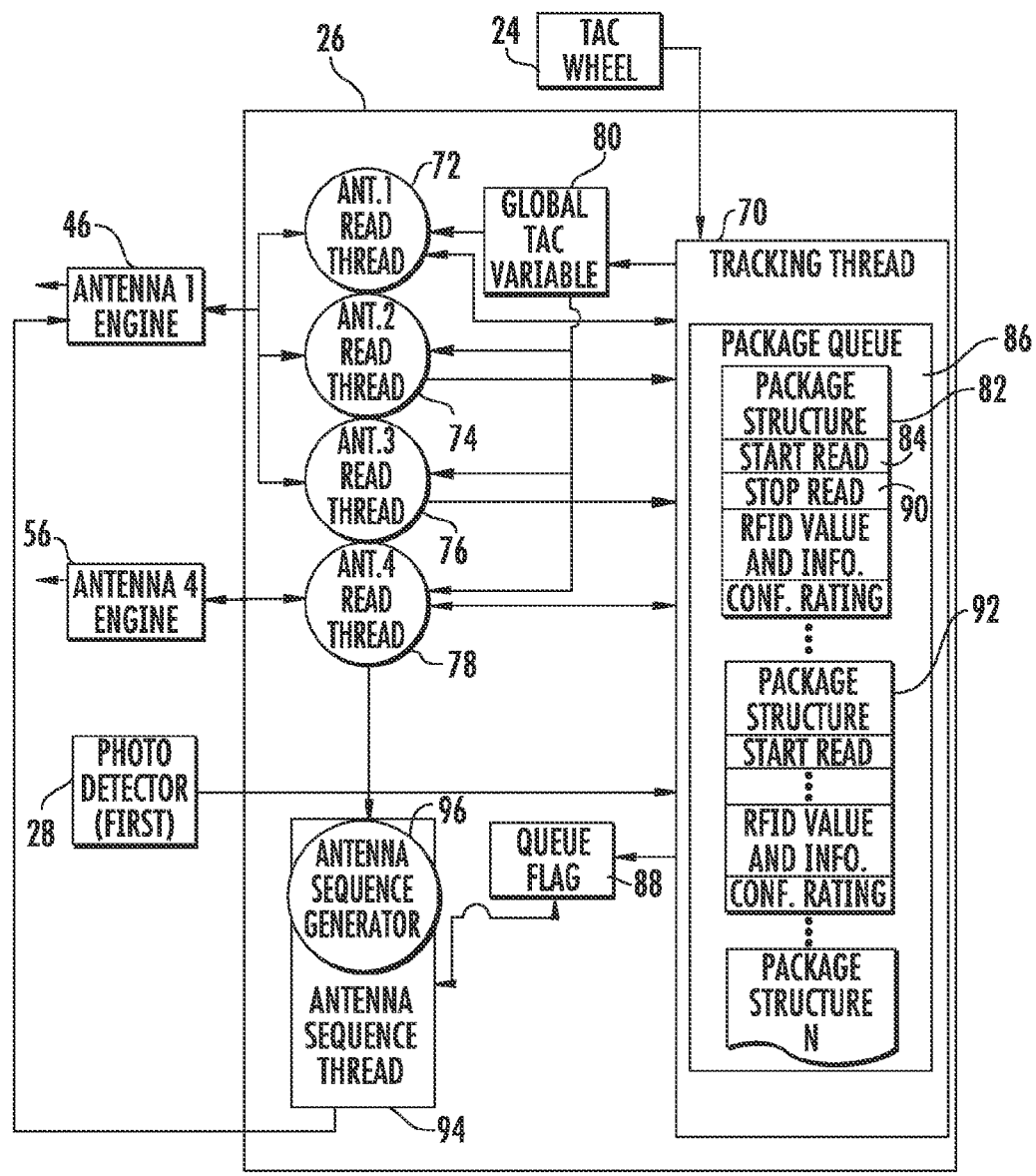
FIG. 1B is a functional block diagram of a tracking system for use with the conveyor system of FIG. 1A.

In operation and referring additionally to FIG. 1B, computer 26 may execute software controlling the tracking system, including a tracking thread 70 and engine read threads 72, 74, 76, and 78. Tracking thread 70 handles communication with TAC 24, such that, as long as conveyor belt 14 moves in direction 22, the TAC constantly sends corresponding pulse signals to computer 26. Tracking thread 70 receives these signals and increments a global tachometer variable 80 ("GTV") with the tachometer pulse id. That is, GTV 80 is a running count of tachometer pulses from a defined start point.

Packages 16, 18, and 20 are placed on conveyor belt 14 at an upstream location and moved by the belt through the path of travel in the downstream direction denoted by arrow 22. A forward most portion, or front edge, of package 20 eventually interrupts beam 30 transmitted by photodetector 28, so that the photodetector (or other suitable sensor) detects presence of the package in the path of travel and transmits a signal corresponding to the interruption (and, therefore, to the package's presence in the path of travel) to tracking thread 70. Circuitry comprising computer 26 is in communication with the photodetector to track the position of each package in the path of travel. For instance, upon receipt of the signal, tracking thread 70 creates a package structure 82 with an id unique to package 20 (unique at least with respect to the packages otherwise presently in the tracking system). Tracking thread 70 initializes a "start read" value 84 to zero and stores the current value of GTV 80 in package structure 82. As conveyor belt 14 moves package 20 downstream (in direction 22), the tracking thread increments the package's start read value 84 with each tachometer pulse. Thus, the value of start read 84 always represents the distance, as measured in tachometer pulses, between photodetector 28 and the front of package 20 and can be used to compare the package's position with respect to other events that may occur downstream from photodetector 28. Tracking thread 70 adds package structure 82 to a package queue 86, which maintains a running list of all packages presently in the tracking system. Upon the creation of package structure 82, the tracking thread updates a queue flag 88, which indicates that at least one package is within the tracking system.

Package 20 continues to interrupt beam 30 until its trailing edge moves beyond the line of sight of photodetector 28. At this point, when beam 30 is uninterrupted, tracking thread 70 initializes a "stop read" value 90 to zero that represents the rear surface of package 20 that interrupted beam 30. Tracking thread 70 stores stop read value 90 in package structure 82 and increments the stop read value with each tachometer pulse so that stop read value 90 contains a value representative of the distance between photodetector 28 and the rear surface of package 20 as measured in tachometer pulses.

Likewise, package 18 is moved by conveyor belt 14 until the front of the package interrupts beam 30, at which point tracking thread creates another package record (92) corresponding to package 18. The process then continues with regard to package 18 in a manner similar to that as described above with respect to package 20. It should be understood from the above description that computer 26 may also store the distance in tachometer pulses between each package in package queue 86 at this time, depending on the desired objectives and requirements of the system.

Still referring to FIGS. 1A and 1B, antenna sequence thread 94 controls engines 46 and 56 in transmitting RFID queries according to a sequence defined by an antenna sequence generator 96. Antenna sequence generator 96 defines the order in which antenna engines 46 and 56 are to activate the antennas. In the present embodiment, the sequence is defined by a list of IDs associated with the respective antennas. For example, if IDs 1, 2, 3, and 4 respectively refer to antennas 36, 38, 40, and 42, a sequence of 1-2-3-4 causes antenna sequence thread 90 to instruct engines 46 and 56 to activate the antennas in that order (i.e., 36, 38, 40, 42). Because simultaneously operating any two antennas within antenna tunnel 34 may cause overlap and interference between the antennas' radiation patterns due to the proximity of the antennas, antenna sequence generator 96 defaults to such a round-robin sequence in the presently described embodiment. The sequence also allows engine 46 to deactivate before the next antenna in the sequence is activated by the engine. As a result, "RF splatter" caused by a change in impedance is less likely to occur when the antenna engine 46 deactivates before the engine activates the next antenna in the sequence with the drive signal.

It should be understood, however, that the present disclosure encompasses other sequences as desired. In another embodiment, for example, bottom antenna 36 may be disposed upstream or downstream from the other antennas within antenna tunnel 34 such that the electromagnetic field radiated by bottom antenna 36 does not overlap the electromagnetic fields radiated by the other antennas in antenna tunnel 34 to an extent that would cause interference in reception of responses from RFID tags. As a result, bottom antenna 36 may constantly send and receive RF signals without interference from the other antennas. In this embodiment, the sequence generated by antenna sequence generator 96 instructs antenna engine 56 to activate antenna 36 so that it constantly attempts to send and receive RF signals to and from nearby RFID tags, provided there is a package in the path of travel as indicated by queue flag 88. The sequence generator simultaneously instructs antenna engine 46 to control antennas 38, 40, and 42 so that they continue to attempt to send and receive RF signals to and from nearby RFID tags in a round-robin manner.

Antenna sequence thread 94 constantly checks queue flag 88 such that, if the queue flag indicates that a package structure is in package queue 86, the antenna sequence thread initializes antenna engines 46 and 56, including setting the read engines to operate at 57,600 baud. Antenna sequence thread 94 then requests an antenna sequence from antenna sequence generator 96 and instructs the RFID engines to drive the antennas according to the sequence. Since queue flag 88 is a binary value, this means that if there is at least one package anywhere in the tracking system, RFID antenna tunnel 34 actively queries for RFID tags. The tunnel deactivates only when there are no packages in the queue, i.e., when there are no packages traveling along conveyor system 10 between photodetector 28 and a predetermined point along conveyor belt 14.

As set forth in greater detail in patent application Ser. No. 11/388,145 and 60/773,634 referenced above, antenna sequence generator 96 creates a sequence defining the power level at which to drive each antenna, the class of RFID tag that the respective antenna will attempt to read, the length of time that each antenna will send and attempt to receive radio signals to and from an RFID tag, and the order by which the antennas will attempt to send and receive. Generally, antenna sequence thread 94 instructs the engine connected to an antenna to transmit a read signal, sleep for 1 millisecond, and then attempt to read any responsive signals from nearby RFID tags. The same process continues with respect to the next antenna identified in the generated sequence. As valid reads (as determined and reported by the antenna engines) are received, the information is reported to tracking thread 70, which then stores the corresponding information, including the antenna id, the tag class, the tag id, and the TAC value from GTV 80 when the read occurred for further analysis as set forth below.

As an antenna engine receives a read command, it drives its corresponding antenna (or the antenna in the engine's group of antennas identified in the command) to radiate query signals into the path of travel 22 at a power designated by the command and for the tag type designated by the command and attempts to read from the antenna responses received from RFID tags present within the antenna's radiation pattern. For instance, bottom antenna 36 may receive a response from an RFID tag in its radiation pattern during a read sequence. Antenna 36 then passes a signal corresponding to the RFID tag response via communication line 54 to antenna engine 56, which transmits at least one corresponding signal, along with an interrupt, to computer 26 via output line 58 as described in detail below with respect to FIG. 2. Engine read thread 78 sees the interrupt and retrieves the data in the signal from the antenna engine. The resulting RFID information includes the RFID data returned from the RFID tag (this data will generally include the tag id—a number unique to the tag—referred to hereinafter as the RFID tag id) and the receiving antenna id. Engine read thread 78 forwards the RFID information to tracking thread 70, which creates an RFID tag record in memory corresponding to the unique tag id if the transmitted information is the first information received by the tracking thread for the given tag. Tracking thread 70 creates a tag response record within the RFID tag record for each signal received corresponding to the unique tag id and stores the RFID information in the tag response record. Tracking thread 70 attempts to assign the RFID tag to a package structure as described below with respect to FIG. 14A, 14B, or 14C. The current value of GTV 80 may also be assigned to the received signal upon the signal's receipt as described in more detail below and stored with the RFID information in the tag response record corresponding to the received response. This may be accomplished either by tracking thread 70 or by the engine read thread corresponding to the antenna that received the response.

In another embodiment, and still referring to FIGS. 1A and 1B, conveyor system 10 includes a second photodetector 94 attached to conveyor frame 12. Second photodetector 94 is positioned to produce a beam 96 at a predetermined height across conveyor belt 14 transverse to the belt's direction of travel 22. Photodetector 94 continuously transmits a signal representative of beam 96 to computer 26. The predetermined height at which second photodetector 94 produces beam 96 correlates to the minimum height of a package at which it is desirable to use top antenna 38 to communicate with RFID tags near the top portion of the package.

In operation, packages that exhibit a height equal to or greater than the height at which beam 96 traverses the area above the conveyor will interrupt the beam, while packages less than the predetermined height will not. Computer 26 receives and stores information within the package's corresponding package structure stored in package queue 86 representative of whether the package interrupted beam 96. When the package nears RFID antenna tunnel 34, top antenna 38 is included in the default round robin sequence generated by antenna sequence generator 96 if the package exhibits a height equal to or greater than the predetermined height at which beam 96 traverses the area above conveyor belt 14 (i.e., if the package interrupted beam 96). If the package exhibits a height less than the predetermined height (i.e., if the package did not interrupt the beam), sequence generator 96 omits antenna 36 from the sequence, while including antennas 36, 40, and 42. Use of second photodetector 94 in combination with this process allows conveyor system 10 to perform a greater number of relevant reads by removing top antenna 38 from the antenna sequence for packages for which a sufficient portion of the package will not pass through the radiation pattern of the top antenna. In this embodiment, the radiation patterns emitted by antennas 36, 40, and 42 generally include an area through which the top portions of a package that exhibits a height less than the relative height of beam 94 will pass, thereby enabling conveyor system 10 to read RFID tags on the package's top portions.

In another embodiment, antennas 36, 38, 40, and 42 are separated and spaced along conveyor system 10 so that their respective radiation patterns do not overlap to an extent that would cause interference among the different antennas in reception of responses from RFID tags. In this embodiment, each antenna is connected to a separate antenna engine. This allows the antennas to constantly transmit and receive RF signals without interference potentially caused by the other antennas. The antenna sequence generated by antenna sequence generator 96 instructs the antenna engines to constantly cycle through the transmit and receive process described above, so that the antennas transmit and receive RFID signals simultaneously with each other. This process provides each antenna, and, thus, the overall system, with a greater number of attempts to communicate with an RFID tag passing through the respective antenna's radiation pattern. Such a configuration, however, requires greater space along conveyor system 10 than the embodiment shown in FIG. 1A. It should be understood that in an embodiment such as this, where each of the system's antennas is configured to constantly attempt to read RFID tags, antenna sequence 94 (and antenna sequence generator 96) may be removed.

As noted above with reference to FIG. 1A, conveyor system 10 includes a bottom antenna 36 that radiates an electromagnetic field extending above conveyor belt 14 in response to a signal supplied by antenna engine 56. An example of such a bottom antenna is described in U.S. patent application Ser. No. 11/388,145 and 60/773,634, referenced above.

Figure 2:
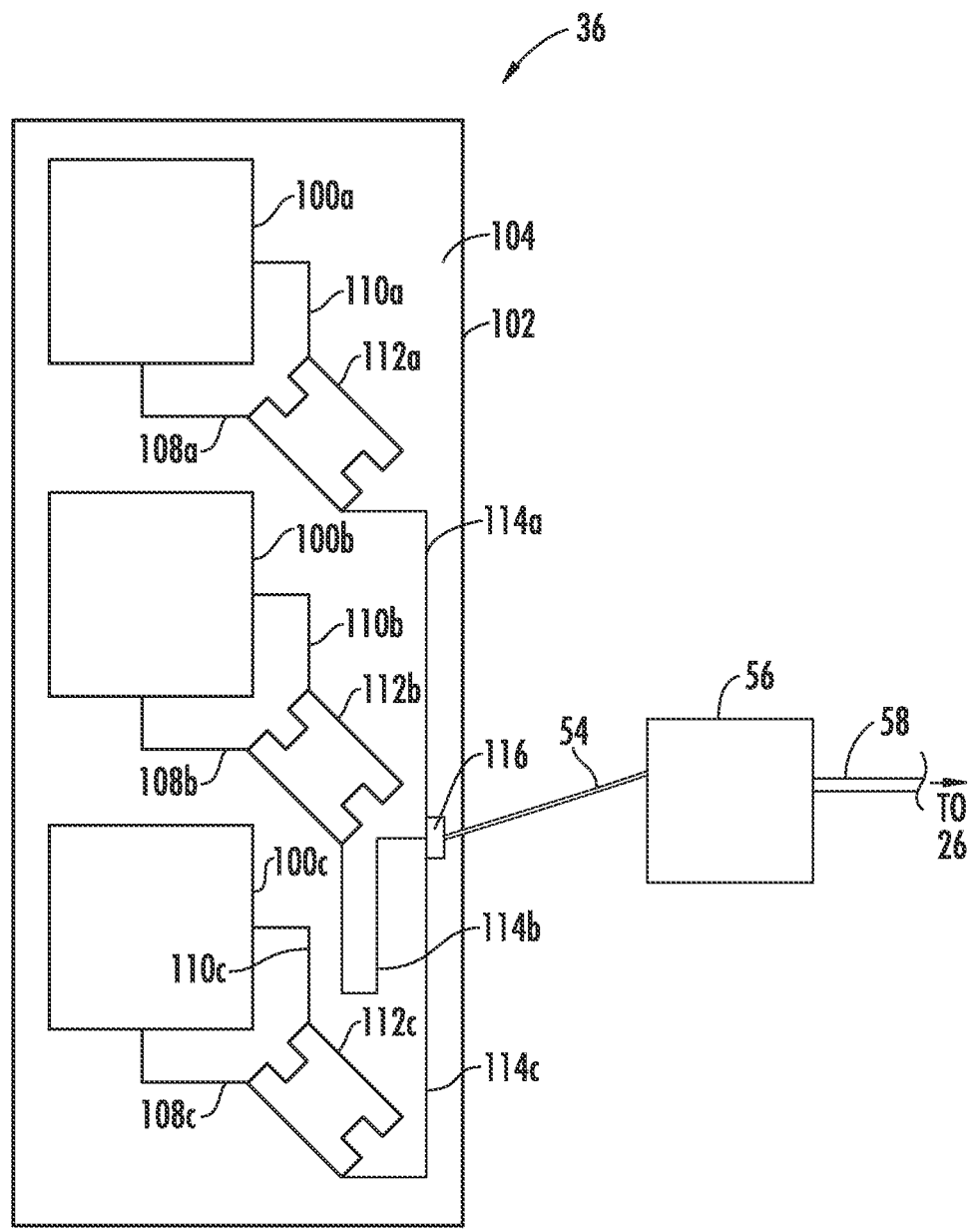
FIG. 2 is a schematic representation of a patch antenna in accordance with an embodiment of the present invention.

In another embodiment, and referring to FIG. 2, bottom antenna 36 may include a single row of three patch elements 100a, 100b, and 100c disposed in a frame 102 on a dielectric substrate 104. As noted in more detail below, antenna 36 may have more or fewer than three patch elements, depending on certain factors such as the width of conveyor belt 14 and the desired size and shape of the electromagnetic field radiated by the bottom antenna. Patch elements 100 are connected to communication line 54 through feed traces 108 and 110, junctions 112, and feed lines 114. A coaxial connector 116 provides a connection between the feed lines 114 of the printed circuit board and antenna engine 56 via RF communication line 54. As noted above, antenna engine 56 is operatively connected to computer 26 via communication line 58. Patch elements 100 radiate an electromagnetic field based on the signal supplied by antenna engine 56 and return any signals transmitted by RFID tags and received by the patch elements to the engine.

In this embodiment, bottom antenna 36 is comprised of a low permittivity polymer foam dielectric substrate and a copper ground plane bonded to the substrate's underside. An exemplary substrate/ground plane material is FOAMCLAD 100, available from Arlon Microwave Materials Division of Arlon, Inc., of Bear, Del. Other suitable materials, such as fiberglass, may be used, although one skilled in the art should recognize that a change in the substrate material can result in changes in the patch dimensions from those discussed below. Assuming the FOAMCLAD material of the presently described arrangement, however, each patch element 100 is stamped from approximately 0.0014 inch thick copper or other high-conductivity metal to form a 5.15 inch sided square and is disposed in the substrate so that the top of the patch is flush with the top surface of the substrate.

The respective feed traces 108 and 110, junctions 112, and feed lines 114 define a feed network between and including connector 116 and the patch elements 100. This feed network is a corporate network that combines the signal received from each patch element 100 and delivers the combined signal to center connector 116. Each path includes feed traces 108 and 110 attached mid-way along adjacent sides of patch elements 100. Feed traces 108 and 110 are attached at their opposite ends to adjacent respective top corners of junctions 112, which are comprised of sides of a length approximately one-quarter the wavelength of the signal carried by the feed network. Junctions 112 connect to ground through a resistor at respective first bottom corners of the junctions and connect to respective feed lines 114 at their opposite bottom corner.

Feed traces 108 and 110 generally have an impedance of approximately 130 ohms, whereas the initial feed lines 114, extending from coaxial connector 116, generally have an impedance of approximately 150 ohms. Accordingly, a one-quarter wave element may be disposed within feed lines 114 to match the impedance. The impedance of patch elements 100 varies with frequency, and the elements define an impedance that provides an acceptable impedance match only over a relatively small percentage of the radiation bandwidth. Of course, the range of what is considered an acceptable impedance match may depend on the performance required of an antenna in a given system.

As should be understand in this art, several factors affect a patch array's achievable bandwidth. Chief among these factors are dielectric thickness and dielectric losses between the patch elements and ground. Accordingly, these characteristics may be varied to achieve a desired impedance match and operative frequency range. In the presently described embodiments, bottom antenna 36 operates within a frequency range of 902 to 928 MHz, as dictated by the Federal Communications Commission. The feed network and patch elements are constructed and arranged so that there is less than −15 dB return loss. It should be understood that the antenna construction and arrangement may otherwise vary. For example, the patch elements may define shapes other than squares.

Assuming the center of the 902 MHz to 928 MHz operative bandwidth, or 915 MHz, the antenna's center wavelength (in air) is approximately 13 inches. As should be understood in this art, however, the permittivity of the substrate and cover material reduces the wavelength of the drive signal in the antenna from the in-air wavelength, the two wavelengths being related by a factor of the in-air wavelength divided by the square root of 2.3, and, in the illustrated embodiment, the antenna wavelength is approximately 10.3 inches. The length of each side of square patch element 100 is one-half the wavelength of the operating frequency, and the length of each side of junction 112 is one-quarter the antenna wavelength. Accordingly, the side of each patch element 100 is approximately 5.15 inches, and the length of each side of junction 112 is approximately 2.58 inches.

Referring additionally to FIG. 1A, patch elements 100 are aligned in a row extending transverse (the "X direction") to path 22 of conveyor belt 14 (FIG. 1A) so that center patch 100b is disposed in the center of the belt's path. Side patches 100a and 100c are aligned with center patch 100b in the transverse direction, and the distance from the outside corner of patch element 100c to the outside corner of patch element 100a is approximately 26 inches, or approximately the width of conveyor belt 14. The center-to-center spacing between adjacent patches is approximately nine inches.

In operation, antenna engine 56 connected to bottom antenna 36 provides a drive signal to the antenna via communication line 54. The drive signal is applied at coaxial connector 116 to feed lines 114, which apply the signal to the bottom left corners of respective junctions 112. Junctions 112 provide the signal to respective patch elements 100 via feed traces 108 and 110. In the present embodiment, feed traces 108 and 110, junctions 112, and feed lines 114 respective to each patch element 100 are identical in both resistance and length/size so that the signals provided to respective patch elements 100 from antenna engine 56 are identical. As a result, bottom antenna 36 creates a radiation pattern 118 exhibiting a centralized power level as illustrated in FIGS. 3A, 3B, and 3C, in which the X direction extends transverse to path 22 of conveyor belt 14, the Y direction extends longitudinally to the belt's path (i.e., the X-Y plane is the plane created by conveyor belt 14 as shown in FIG. 1A), and the Z direction extends vertically above the belt.

Figure 3A:
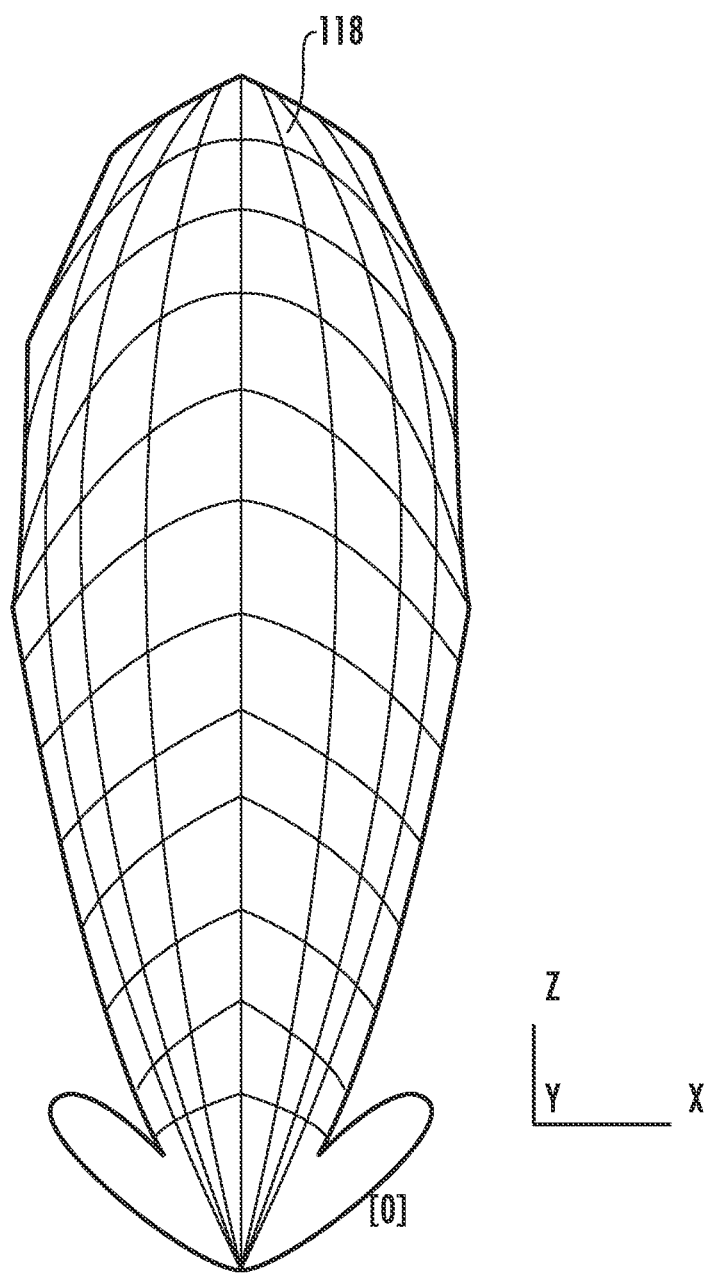
FIGS. 3A, 3B, and 3C are graphic representations of a radiation pattern produced by the patch antenna depicted in FIG. 2.
Figure 3B:
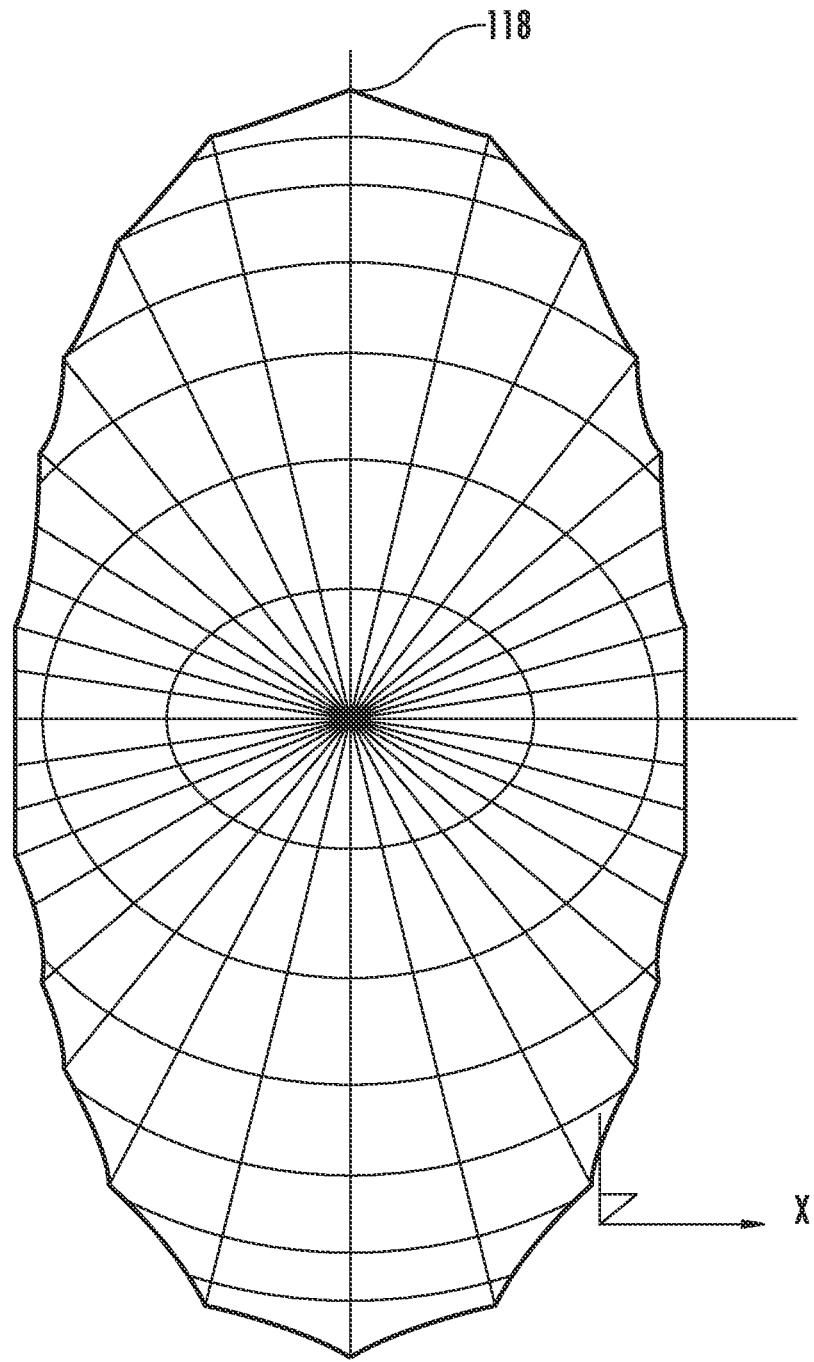
Figure 3C:
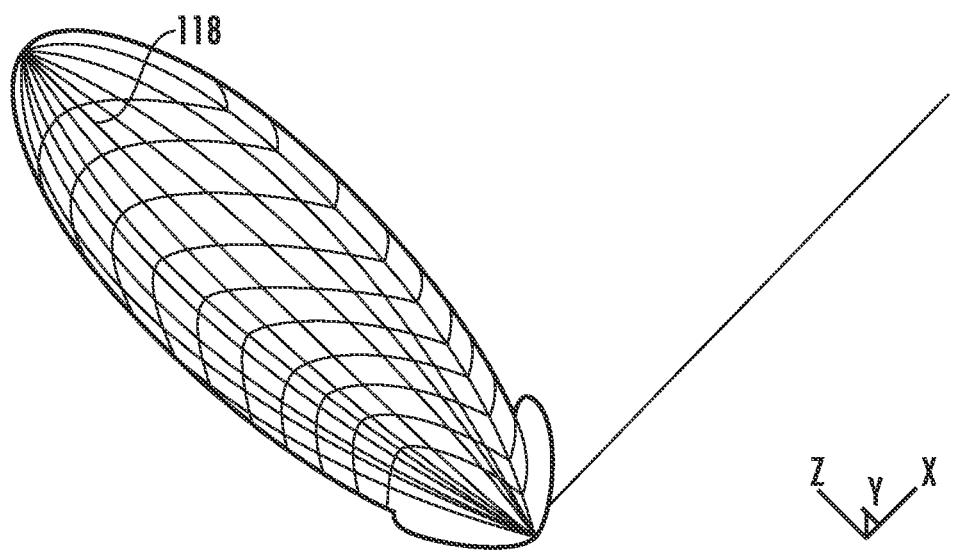

Radiation pattern 118, as shown in FIGS. 3A, 3B, and 3C, is the radiation pattern's far field electric component. As should be understood in this art, the far field can be considered as the area outside a sphere of a radius equal to twice the square of the antenna array's longest dimension (in this instance, 26 inches), divided by the in-air wavelength, where the patch array is considered to be a point. While there is a transition area between the near and far fields, the radiation pattern in the near field area is dominated by the electric field component. Particularly when above or otherwise very close to a patch in the near field, an RFID tag is detected by the patch's near field component without interference from the other patches. Generally, it is desired that RFID tags respond to the near field pattern of the bottom antenna, but not the far field pattern, to thereby reduce the likelihood of an undesired response from an RFID tag on a package other than the targeted package.

Referring again to FIGS. 3A, 3B, and 3C, radiation pattern 118 includes a main lobe exhibiting a relatively wide dimension in the Y direction along the conveyor belt's center line. The size of the two side lobes is generally a function of the spacing between the patches and is minimized when the center-to-center spacing between the patches is equal to one-half the drive signal's in-air wavelength. Given the preferred dimensions of patch elements 100 in the presently described embodiments, the nine inch center-to-center spacing was chosen to span the width of conveyor belt 14, thereby resulting in the side lobes illustrated in FIGS. 3A, 3B, and 3C.

As shown in FIGS. 3A, 3B, and 3C, radiation pattern 118 extends from the patch array upstream and downstream in the Y direction with respect to the conveyor belt's path of travel 22 and above the belt in the Z direction so that the front and back edges of the radiation pattern extend at an angle in the Y-Z plane. Accordingly, RFID tags disposed on relatively low packages carried by conveyor belt 14 may not be seen by the far field radiation pattern until the package is relatively near to bottom antenna 36. Tags on taller packages, on the other hand, may be seen by the main lobe farther upstream and farther downstream due to the shape of the radiation pattern. Thus, depending on the spacing between the packages, there may be an increased probability that the antenna will simultaneously receive responses from different RFID tags disposed on various packages that are simultaneously within the far field radiation pattern emitted by bottom antenna 36.

Referring again to FIG. 2, in another embodiment, feed line 114b may be shortened by a specific length so that the signal received by patch element 100b from antenna engine 56 (and, thus, the signal transmitted by patch element 100b) is shifted 79 degrees ("°") in phase with respect to the signals transmitted by patch elements 100a and 100c. In other words, the length of feed line 114b is reduced by an amount that corresponds to a 79° phase shift in the signal to patch element 100b provided by antenna engine 56. Consequently, bottom antenna 36 in this embodiment produces a radiation pattern 120, as depicted in FIGS. 4A and 4B.

Figure 4A:
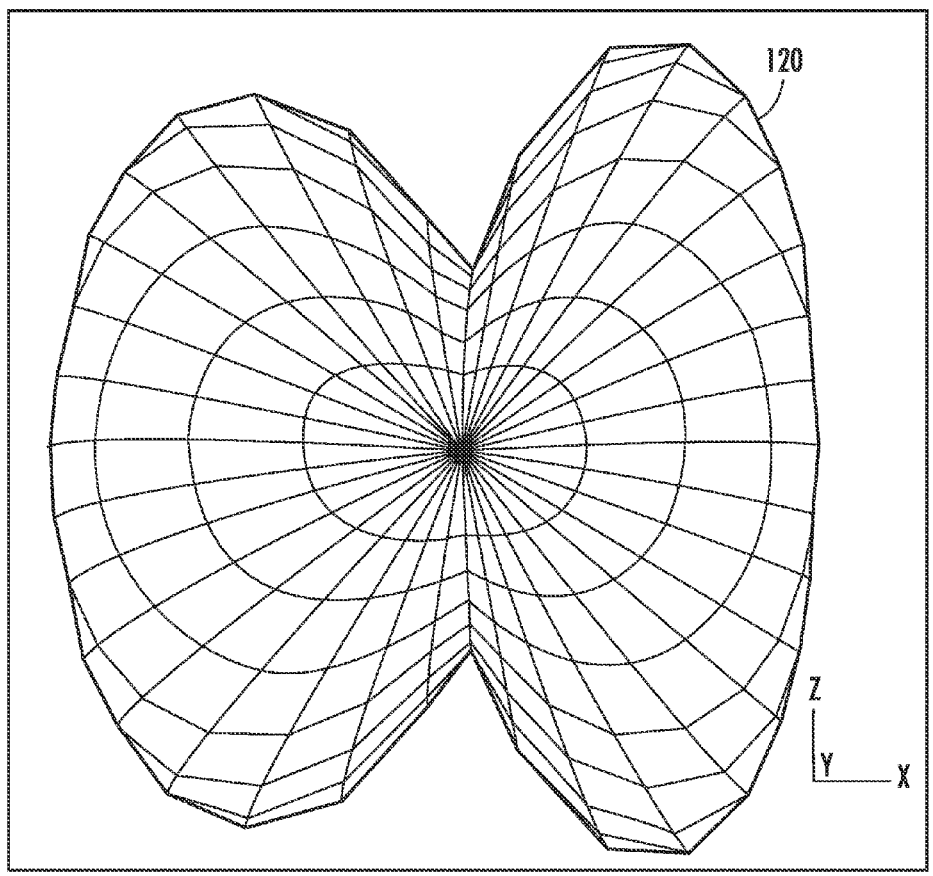
FIGS. 4A and 4B are graphic representations of a radiation pattern produced by a variation of the patch antenna depicted in FIG. 2.
Figure 4B:
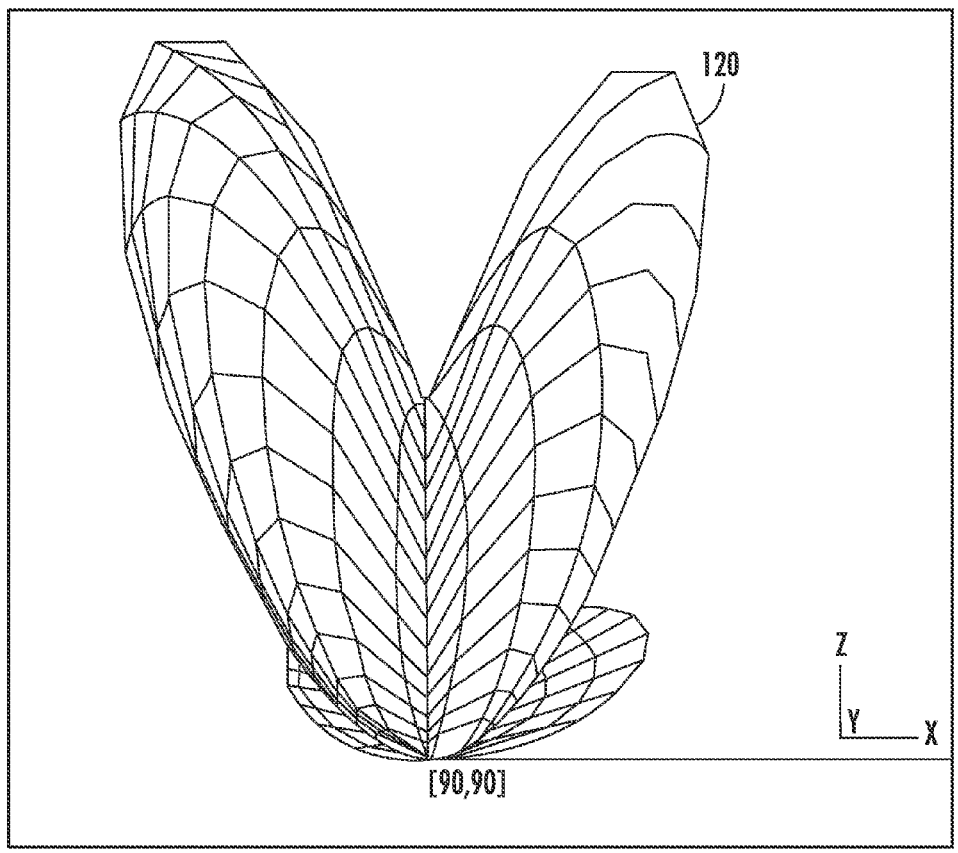

Referring to FIGS. 4A and 4B, radiation pattern 120 generally exhibits two far field lobes that have a relatively wide dimension in the X direction (transverse to path 22 of travel of conveyor belt 14) and a relatively narrow dimension in the Y direction (parallel to path 22) along the centerline of path 22. As compared to radiation pattern 118 (FIGS. 3A, 3B, and 3C), radiation pattern 120 is configured to read RFID tags across the width of conveyor belt 14 (i.e., in the X direction) more effectively and to inhibit reading RFID tags either upstream or downstream (i.e., in the Y direction) from bottom antenna 36. The reduction of the radiation pattern's Y-axis dimension also helps to minimize cross-talk between bottom antenna 36 and antennas 38, 40, and 42 where the bottom antenna is shifted from the other three antennas in the Y direction. Additionally, the overall power in the far field is reduced due to the more even distribution across the width of the belt. As a result, the power of the electromagnetic field directed toward top antenna 38 is reduced.

Figure 5A:
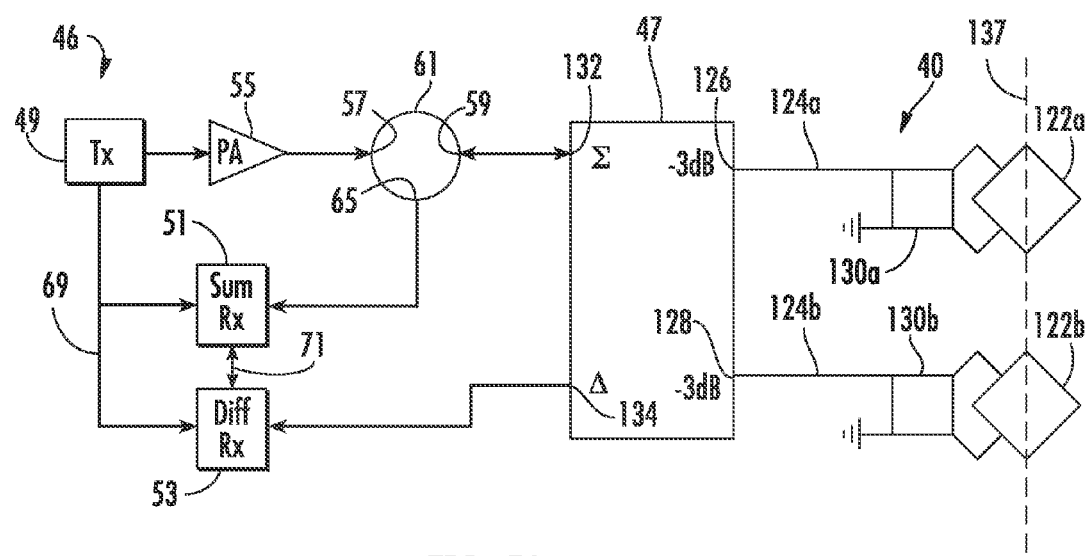
FIGS. 5A and 5B are schematic representations of patch antennas in accordance with embodiments of the present invention.

The construction and operation of antennas 38, 40, and 42 are identical with regard to the number of patch elements and their connection with the engine, and are, thus, described in detail below with reference to antenna 40 and engine 46 (FIG. 1A) only. Referring to FIG. 5A, antenna 40 is comprised of two patch elements 122 disposed on a dielectric substrate on the opposite side of the substrate from a ground plane. Circuitry comprising engine 46 includes a transmitter 49 and two receivers 51 and 53. Transmitter 49 provides a drive signal to a feed line 124a through a power amplifier 55, a first port 57 and a second port 59 of an RF circulator 61, and a sum port 132 and an antenna port 126 of a sum/difference device 47. Sum/difference device 47 receives the transmitter signal at port 132, splits the signal and applies the split, in-phase signals as outputs at ports 126 and 128. Thus, the transmitter signal is also applied to a feed line 124b. Feed lines 124a and 124b apply the transmitter signal to respective square connectors 130a and 130b that, in turn, supply the signals to the respective patch elements 122a and 122b. As described below, return signals from patch elements 122a and 122b are summed (in phase) and output at port 132 (the sum signal), whereas the two return signals are summed (with one phase-shifted by 180°) and output at port 134 (the difference signal). The summed return signals are applied to second port 59 of circulator 61 and output from a third port 65 to sum receiver 51. The difference return signals are output from port 134 to difference receiver 53. Sum and difference receivers 51 and 53 are timed by a signal 69 from transmitter 49 and output received signals to computer 26 (FIG. 1A), which controls a synchronization signal 71 so that only one of the receivers outputs to the computer at a time.

If an engine is used that has only a single receiver, a separate engine may be used to perform the functions of receiver 53. The separate engine receives the signal from port 134, is timed by transmitter 49 of the initial engine, and communicates with computer 26 (FIG. 1A).

In an embodiment (referring to FIG. 5B), discussed in more detail below, in which the system monitors only the difference signal output from port 134, an engine 46 comprises a single transmitter 49 and a single receiver 53. The summed return signals are applied on a line between power amplifier 55 and port 132 but blocked by the amplifier. The difference return signals are output from port 134 to difference receiver 53.

The centers of patch elements 122a and 122b are spaced apart a specific distance that corresponds to approximately one-half the wavelength of the radio signal provided by engine 46 to feed lines 124. The spacing between elements 122 is a tradeoff between antenna pattern and inter-element coupling, which can modify the antenna impedance matching and currents. Placing patch elements 122 closer to one another will increase the coupling effects, as well as increase the difficulty in matching and phasing.

In operation, patch elements 122 radiate an electromagnetic field in response to the signal supplied by engine 46 via feed lines 124 and square connectors 130. RFID tags located within the radiated field are energized and transmit a responsive signal. Depending on the distance between the RFID tag transmitting the signal and patch elements 122a and 122b, either or both patch elements receive the responsive signal and transmit it to engine 46 via the respective square connector 130 and feed line 124 through sum/difference device 47. Any signal received by patch element 122a is transmitted to sum/difference device 47 through port 126. Similarly, any signal received by patch element 122b is transmitted to sum/difference device 47 through port 128. In the illustrated embodiments, device 47 is a sum/difference device that outputs signals at ports 132 and 134 that are created in response to the signals received from patch elements 122a and 122b through ports 126 and 128. The signal output by sum/difference device 47 at port 132 is the sum of the signal received at port 126 from patch element 122a and the signal received at port 128 from patch element 122b (referred to herein as the "sum signal"). Sum/difference device 47 shifts the phase of the signal received at port 128 from patch element 122b by 180°, combines it with the signal received at port 126 from patch element 122a, and outputs the combined signal at port 134 (referred to herein as the "difference signal"). This process, which creates the difference signal, may also be referred to as subtracting the signals received by patch elements 122. An example of such a sum/difference device, which should be known in the art, is a hybrid coupler, model no. 30054, manufactured by ANAREN of East Syracuse, N.Y. It should be understood by one of ordinary skill in the art that any device capable of outputting a signal, along with a phase-shifted variation of that signal, may be used as long as the device is able to shift the phase of the signal approximately 180°. Sum/difference device 47 transmits the sum and difference signals to engine 46 as described above, which receives the signals and forwards corresponding signals to computer 26. Sum/difference device 47 affects the magnitude of the tag response signal in a manner as described below with regard to FIG. 6A, but it does not affect the data carried by the signal. A sum or difference signal from device 47 conveys the same tag information as does a response received from bottom antenna 36, and computer 26 similarly stores the sum/difference signals as tag responses in data records. Computer 26 also stores the magnitude of the received signal from each of the side and top antennas.

Figure 6A:
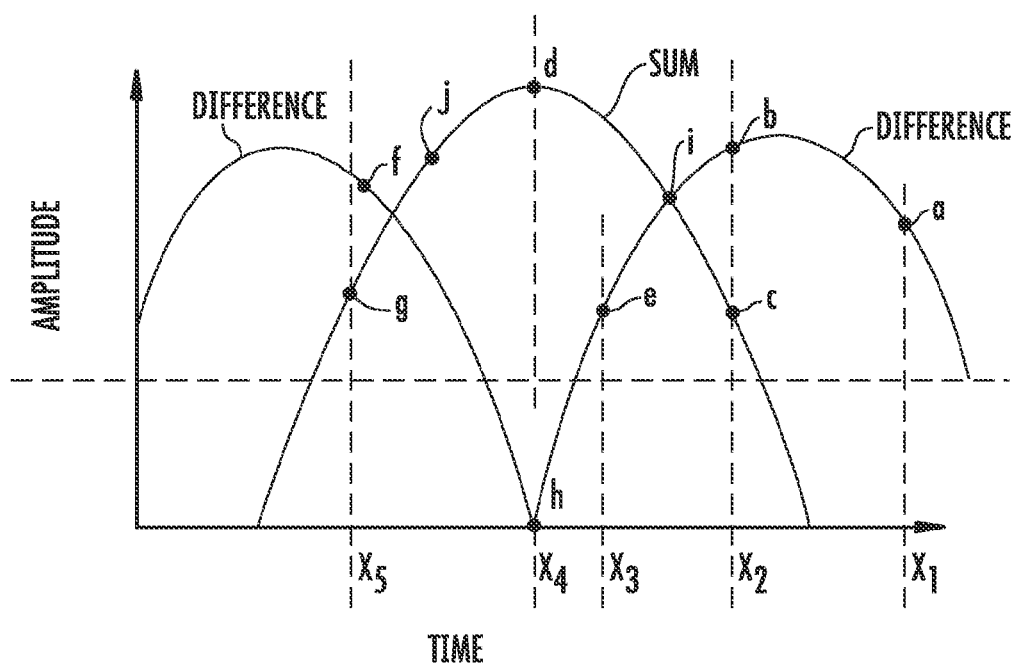
FIG. 6A is a graphic representation of sum and difference signals created in response to signals received from an RFID tag in accordance with an embodiment of the present invention.

FIG. 6A, and still referring also to FIG. 5A, illustrates a graphical comparison of exemplary sum and difference signals produced by sum/difference device 47 as it receives signals transmitted by an RFID tag passing through the antenna's radiation pattern. The two outside curves (labeled "difference") illustrate the appearance of a difference signal provided by sum/difference device 47 on port 134 if the antenna patch elements constantly receive a signal from an RFID tag on a package as the package moves through the predetermined area, or detection zone. Likewise, the middle curve (labeled "sum") illustrates the appearance of a sum signal provided by sum/difference device 47 on port 132 if the antenna constantly receives a signal from the RFID tag on such a package. Points along the graph, labeled a, b, c, d, e, f, g, h, i, and j, illustrate specific signals output by sum/difference device 47 on port 132 (the sum signal) and on port 134 (the difference signal) based on the receipt of signals transmitted by an RFID tag at different locations as the tag passes through the electromagnetic field radiated by the antenna.

Figure 6B:
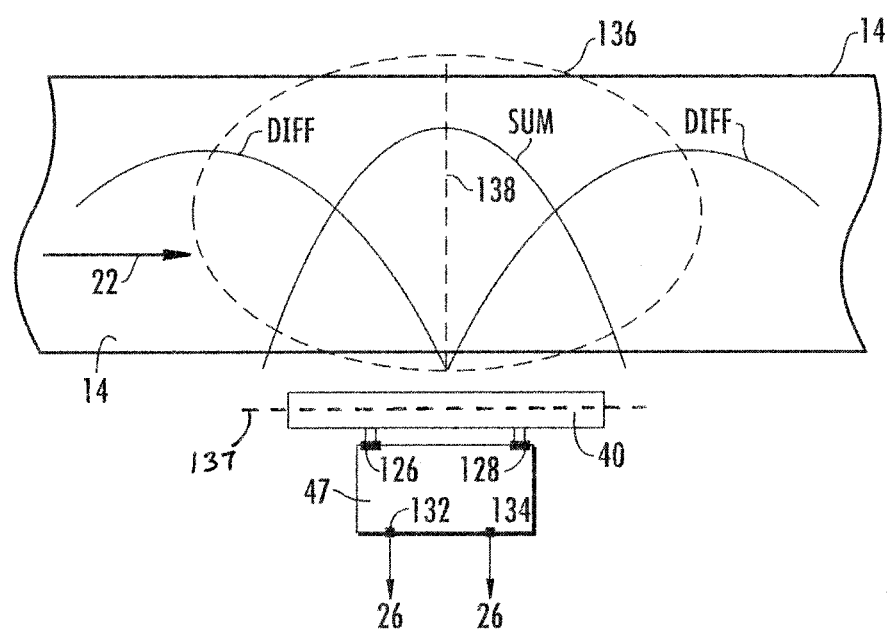
FIG. 6B is an overlay of the graphic representation of FIG. 6A onto a portion of the schematic representation of the conveyor system shown in FIG. 1A.

FIG. 6B is an illustration of exemplary sum and difference signals received by computer 26 from device 47 from ports 132 and 134, respectively, via engine 46 (FIG. 5A) arising from signals transmitted by an RFID tag on a package moved by conveyor belt 14 in the direction denoted by arrow 22 and output to sum/difference device 47 through ports 126 and 128 from patch elements 122 (FIG. 5A) of side antenna 40. Patch elements 122 (FIG. 5A) are aligned horizontally with respect to conveyor belt 14, so that an axis 137 passing through the centers of the two patches is parallel to path 22 of travel, as indicated in FIG. 6B, and so that a plane that includes the surfaces of the patch elements is approximately perpendicular to the plane defined by conveyor belt 14 (FIG. 1A). A line 138 that is perpendicular to axis 137 and parallel to the plane of belt 14 passes through the midpoint between patches 122. Tracking thread 70 (FIG. 1B) can access the value stored by computer 26 representing the distance in tachometer pulses between beam 30 and line 138 as described above. Accordingly, using the data supplied by TAC 24 (FIG. 1A) and the distance value of line 138, tracking thread 70 can identify whether a package occupies an area that includes line 138 at any time as explained in more detail below. A plane that includes line 138 and is perpendicular to the plane defined by conveyor belt 14 represents all points that are equidistant from patch 122a and patch 122b (referred to herein as "the midpoint plane").

Referring to FIGS. 5A, 6A, and 6B, an RFID tag is equidistant from patch elements 122a and 122b when the tag intersects the midpoint plane. When a tag intersects the midpoint plane, both the phase and amplitude of the signal received by patch element 122a should be identical to the phase and amplitude of the signal received by patch element 122b. The combination of these identical signals produces a sum signal exhibiting the same phase but twice the amplitude as the individual signals received by each patch element 122. Sum/difference device 47 outputs this sum signal at port 132, as indicated by point d on the graph shown in FIG. 6A.

As described above, sum/difference device 47 shifts the phase of the signal received by patch element 122b by 180°, combines this phase-shifted signal with the signal received by patch element 122a, and outputs the combined signal at port 134. Because the frequencies of the signals received by patch elements 122 are identical, the phase-shifted signal is the inverse of the non-phase-shifted signal. As a result, when the RFID tag is at line 138, the amplitudes of the two out-of-phase signals negate one another when combined, thus producing an amplitude of zero (represented by point h). Thus, the difference signal derived from a signal transmitted by an RFID tag is at a minimum, and in ideal circumstances a null or zero, when the tag is located anywhere along the midpoint plane.

As the RFID tag moves away from equidistant line 138 in either direction, the signals received by patch elements 122a and 122b begin to vary due to the differing distances traveled by the respective signals from the RFID tag to the two patch elements. In one instance, as the package bearing the RFID tag is moved downstream by conveyor belt 14, the RFID tag moves toward patch element 122b, away from patch element 122a, and away from equidistant line 138. As a result, the signal emitted by the RFID tag travels a shorter distance to patch element 122b than it does to patch element 122a. The amplitude of the signal output by patch 122b is greater than the amplitude of the signal output by patch 122a, and the phase of the signal output by patch 122b leads the phase of the signal output by patch 122a. These differences cause the amplitude of the sum signal to decrease (as indicated by the curve moving from point d toward and through point c). Similarly, as the package bearing the RFID tag is upstream from line 138 and moving in direction 22 toward line 138, the amplitude of the signal output by patch 122a is greater than the amplitude of the signal output by patch 122b, and the phase of the signal output by patch 122a leads the phase of the signal output by patch 122b. These differences cause the amplitude of the sum signal to increase (as indicated by the curve moving toward and through point g to point d).

With regard to the difference signal, when the package bearing the RFID tag is offset upstream or downstream from midpoint 138, the signals received by patch elements 122 are not identical in amplitude or phase. Thus, the 180° phase-shifted variation of the signal received by patch element 122b is not the inverse of the signal received by patch element 122a. As a result, the combination of these signals (i.e., the difference signal) exhibits a positive amplitude, as represented by the portions of the difference curve including points f and e. The portions of the difference curve on either side of line 138 are both positive, since the sum/difference device outputs the absolute value of the difference.

Moving away from midpoint 138 upstream or downstream, the amplitude of the sum signal decreases, while the amplitude of the difference signal increases. In either direction, the difference signal's amplitude peaks and then decreases toward zero.

As noted above, computer 26 assigns the current value of GTV 80 (FIG. 1B) to each signal as it's received, in one embodiment. In such an embodiment, tracking thread 70 attempts to assign the relevant RFID tag to a package structure in the manner described below with respect to FIG. 14B or 14C. In another embodiment, if a package occupies an area that includes line 138 when a signal is received, computer 26 assigns the corresponding package structure id to the received signal and stores both in the tag response record within the record corresponding to the RFID tag. As described above, each package record includes a start read value 84 (FIG. 1B) that corresponds to the distance (in TAC pulses) the front of the package has traveled from photodetector 28 (FIG. 1A), and a stop read value 90 (FIG. 1B) that corresponds to the distance (in TAC pulses) the back of the package has traveled from the photodetector. Tracking thread 70 (FIG. 1B) also stores a value (in TAC pulses) corresponding to the distance between the photodetector and line 138 along path of travel 22. In this embodiment, when computer 26 stores a tag response, it determines if there are any package structures for which this stored distance is between the package structure's start read value 84 and stop read value 90 at the time the response is received. If so, there is a package in an area in the path of travel that includes line 138, and computer 26 stores the package structure id 82 (FIG. 1B) in the sub-record for the response. If no package structure meets these criteria, the response is stored in a sub-record without an identification of a package. In such an embodiment, tracking thread 70 attempts to assign the relevant RFID tag to a package structure in the manner described below with respect to FIG. 14A.

In the embodiments described below with regard to FIGS. 14A, 14B, and 14C, and also with reference to FIGS. 1A and 5A, port 132 of sum/difference device 47 is deactivated or is disconnected from engine 46 so that no sum signal is transmitted to computer 26 (or computer 26 is programmed to ignore the sum signal), and computer 26 analyzes only the difference signal transmitted by sum/difference device 47 on port 134 via the engine to determine the relative position of an RFID tag. The receiver attached to the sum port may be removed so that there is no connection to port 132. Sum/difference device 47 transmits a difference signal on port 134 based on any signals received by patch elements 122 from an RFID tag in a manner identical to that described above. As the package and its RFID tag move within the radiation pattern of the antenna, device 47 produces a difference signal, which increases to a maximum magnitude upstream of point f (FIG. 6A) as described above. As the RFID tag located on the package moves closer to midpoint 138, the difference signal decreases until it reaches a minimum point or a null, and then, as the tag moves away from the midpoint, the difference signal's magnitude increases. Device 47 outputs these signals to computer 26, which stores the signals for analysis as described below.

Referring now more specifically to the operation of these embodiments, with reference to FIG. 1A, conveyor belt 14 moves package 20 downstream and eventually through RFID antenna tunnel 34. Antennas 36, 38, 40, and 42 attempt to read any RFID tags located on package 20 as it passes through the radiation patterns of the respective antennas. Antennas 36, 38, 40, and 42 transmit any signal received from any RFID tag to the respective antenna read engine connected to the antenna. As noted above, each of the two side antennas 38 and 40 and top antenna 42 is constructed as described above with reference to FIG. 5A. In the presently-described embodiment, antennas 38, 40, and 42 are connected to respective sum/difference devices (such as device 47 of FIG. 5A), each of which outputs a difference signal to its engine based on the signals received from RFID tags in the manner described above (antenna 36 outputs signals received by the antenna to the computer via engine 56 as described above). Computer 26 uses the signals received from the three sum/difference devices in an algorithm (e.g., as described below with respect to FIG. 14A, 14B, or 14C) to correlate tag data to a package on which the tag is disposed. Computer 26 processes the stored signals received from engine 56 according to the algorithm described in patent application Ser. No. 11/388,145 and 60/773,634 with respect to the bottom antenna, and the tracking algorithm for bottom antenna 36 is therefore not described in further detail herein.

In one embodiment, where bottom antenna 36 is located slightly upstream along conveyor belt 14 with respect to antennas 38, 40, and 42, computer 26 only stores difference signals for a given RFID tag from devices 47 associated with antennas 38, 40, and 42 if it has already received a signal from antenna 36 corresponding to the same RFID tag. Since each tag response carries information unique to its tag, when computer 26 receives a tag response, the computer can check the response against previously-stored responses to determine if any stored responses correspond to the same tag. In this embodiment, computer 26 includes information in the data stored in each tag response received identifying the antenna and/or the antenna engine from which the tag response was received. In this embodiment, if the computer receives a tag response from any one of the side or top antennas before a response from the bottom antenna is stored, such responses are ignored and not stored. Any response for the tag from bottom antenna 36 is stored, and responses from the side and top antenna for the same tag will thereafter be stored. Because the bottom antenna typically reads tags on a package as the package moves over the bottom antenna but generally not when the package is upstream from the bottom antenna, this tag storage criteria increases confidence that stored tag data corresponds to tags that have entered the antenna tunnel area.

Once computer 26 begins storing tag responses from the side and top antennas, for a given tag, the computer collects and stores response signals from that tag from each of the three sum/difference antennas, and from bottom antenna 36, until the signals indicate that the tag has passed through the detection zone. More specifically, after the tag has reached the bottom antenna, computer 26 expects to receive a difference signal from the side and top antennas, or a signal from the bottom antenna, at a certain regularity. Once the computer begins storing tag responses from the side and top antennas for a given tag, the computer initiates a timer upon receipt of each response for that tag regardless from which antenna the response is received. If the next response is received before the timer expires, the timer is reset. If the timer's predetermined time period expires before a subsequent tag response is received, then it is assumed that the tag has moved sufficiently beyond the antenna tunnel that it is no longer desired to store responses from the tag, and any further responses received from the tag are ignored and not stored. Accordingly, the detection area for that tag can be considered the length of the path of travel from the point at which the computer begins to store tag responses after the first read from the bottom antenna to the point at which the computer ceases to store tag data due to the timer's expiration. When the computer stops storing tag responses due to the timer's expiration, the computer processes the responses for the tag in order to determine which package to assign the tag data, as described below with respect to FIG. 14A, 14B, or 14C.

In summary, computer 26 begins storing tag responses as data records once responses begin to be received for the given tag from the bottom antenna and stops storing tag responses when the timer expires after receipt of the last previous response for that tag without any intervening reads for that tag. Each data record includes at least the tag id and, for the responses received from the top and side antennas, the magnitude of the difference signal received from the antenna's sum/difference device. At this point, the RFID tag is not assigned with any package structure, and so computer 26 executes an algorithm, e.g., as described below with regard to FIG. 14A, 14B, or 14C, to assign the tag to a package structure. If, upon completion of such an algorithm, the tag is assigned to a particular package, computer 26 adds a data record to the package's package structure that includes the tag's id.

In the embodiments described below with respect to FIGS. 14B and 14C, GTV 80 (i.e., the TAC value) at the time the response is received is also stored in the tag response record along with the other RFID information from the tag response. In the embodiment described with respect to FIG. 14A, however, tracking thread 70 stores the package id corresponding to a package occupying an area along path of travel 22 (FIG. 1A) that includes line 138 (FIG. 6B) when a tag response signal is received in the tag response record associated to the signal as described above.

Figure 14A:
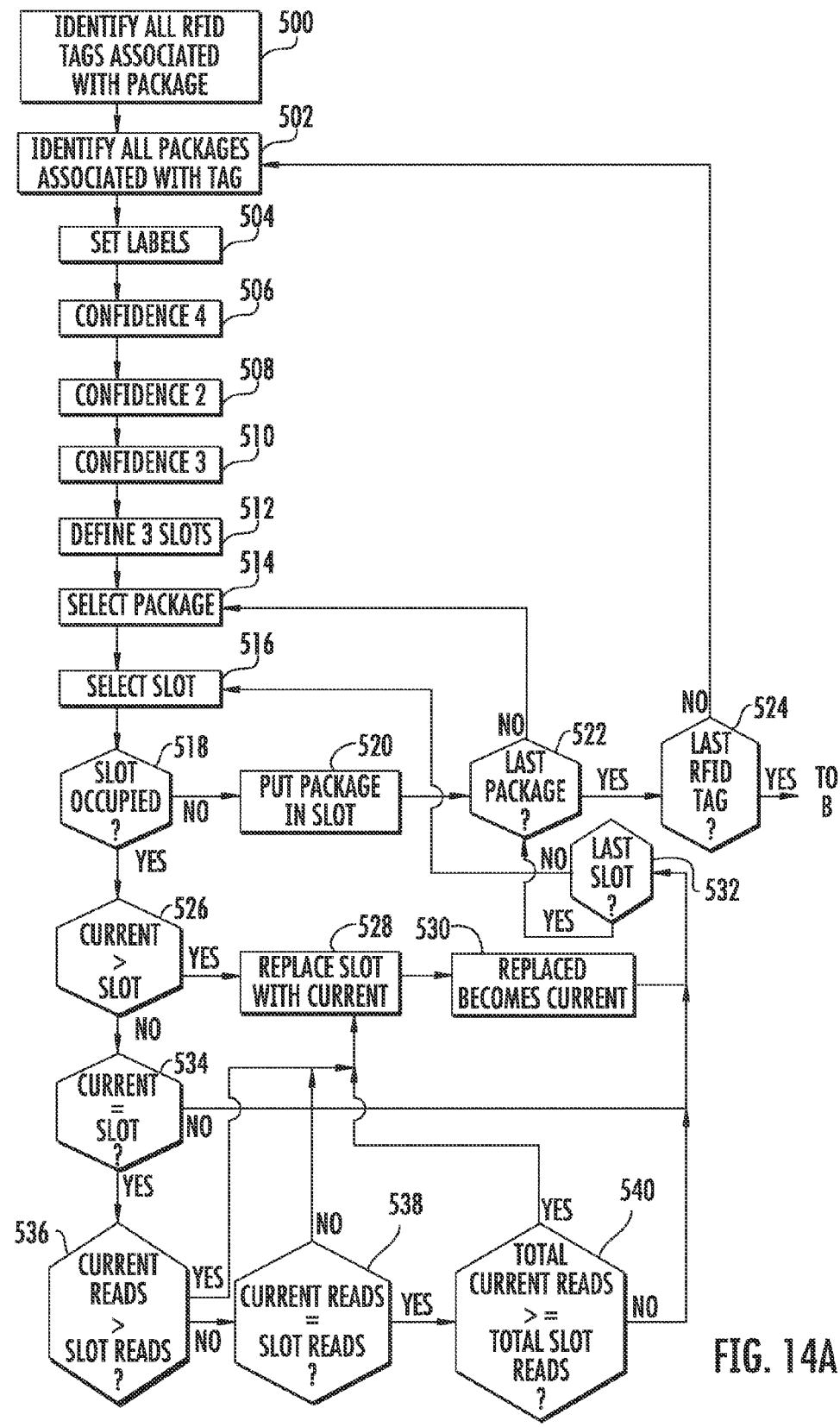
FIGS. 14A, 14B, and 14C are flowcharts illustrating methods for assigning an RFID tag to a package in accordance with varying embodiments of the present invention.

Another difference in the embodiment of FIG. 14A is the manner in which the tag reading procedure closes. As in the embodiments of FIGS. 14B and 14C, computer 26 begins storing tag responses for a given tag when a response corresponding to the tag's unique id is received for the first time. Rather than closing tag response storage based on timer expiration, however, computer 26 stops storing tag responses for the given tag when the start read value 84 (FIG. 1B) of a package structure associated with a tag response record for the given tag reaches a predetermined value, thereby indicating that the associated package has reached a predetermined point downstream from the antenna tunnel on path of travel 22 (FIG. 1A). That is, when a package structure's start read value 84 reaches the predetermined value, it indicates that the corresponding package has reached a point sufficiently downstream from photodetector 28 (FIG. 1A) (as measured in TAC pulses) that tracking thread 70 is able to process any RFID responses associated with the package structure. Any additional responses corresponding to the given tag received by any of the antennas are ignored. When the start read value 84 (FIG. 1B) of any such associated package structure reaches this value, tracking thread 70 stops storing the tag responses and executes the algorithm described below with respect to FIG. 14A to determine to which package structure associated with the given tag the tracking thread should assign the tag.

The distance downstream from the antenna tunnel to the predetermined point may be selected as desired, but is preferably sufficient so that a package reaching the point is adequately far from or through the tunnel that it is no longer desired to store tag reads from that package. It should be understood that tag responses for a given RFID tag also may be processed as described below with respect to FIG. 14A upon the expiration of a timer as explained above.

FIG. 14A describes an algorithm executed by tracking thread 70 (FIG. 1B) in an embodiment in which the system relies only on the difference signals. In this exemplary embodiment, tracking thread 70 associates with each tag response data record the package structure id of any package occupying an area that includes line 138 when the tag response was received, as described above. Tracking thread 70 stops storing tag responses when start read value 84 (FIG. 1B) of a package structure to which the tracking thread has associated a tag response record for the given tag has incremented to a predetermined value, as described above, in this embodiment. Alternatively, tracking thread 70 stops storing tag responses for the given tag upon the expiration of a timer as described above.

When any package (the "present" package) reaches the predetermined downstream point, at step 500, tracking thread 70 (FIG. 2) identifies all RFID tags having stored data records with which the present package structure is associated. Computer 26 (FIG. 1A) selects one of the RFID tags identified at step 500 and, at step 502, identifies all upstream package structures associated with any data record for the same RFID tag. At step 504, computer 26 identifies the first and last stored responses for the RFID tag and assigns the labels "FIRST" and "LAST," respectively, to these stored data records. Because the tag responses are stored in the tag record corresponding to the tag's unique id as they are received, the first tag response record is labeled FIRST and the last tag response record created for the same RFID tag is labeled LAST. Alternatively, in an embodiment where computer 26 stores the current value of GTV 80 with each tag response when the response is received, the tag response record associated with the lowest GTV is labeled FIRST and the response record associated with the highest GTV is labeled LAST. Computer 26 identifies the difference signal (i.e., a response from this tag for any package, from any of the side or top antennas) between the FIRST and LAST signal having the lowest magnitude and assigns the label "NULL" to that response signal. If multiple difference signals exhibit the same lowest magnitude, which is lower than the magnitude of the two surrounding difference signals associated with the same RFID tag, computer 26 assigns the "NULL" label to each such difference signal.

At step 506, computer 26 identifies any package structure having an id associated to a response data record labeled NULL and assigns this RFID tag's id to that package structure, with a confidence rating of 4. This indicates that the corresponding package occupied an area that included line 138 when the signal, now labeled NULL, was received. At step 508, computer 26 identifies any package structure (other than a package structure identified at step 506) having an id associated to a signal labeled FIRST or LAST and assigns this RFID tag's id to that package structure, with a confidence rating of 2. This indicates that the corresponding package occupied an area that included line 138 when either of the signals labeled FIRST or LAST was received. At step 510, for each package structure associated with a stored response for this tag, where computer 26 has not assigned a confidence rating to the package for the tag, the computer assigns a confidence rating of 3. This indicates that the corresponding package occupied an area that included line 138 when computer 26 received at least one difference signal associated with the RFID but did not occupy an area that included line 138 when the computer received any of the signals labeled NULL, FIRST, or LAST. That is, the corresponding package occupied an area that included line 138 between the time computer 26 received the first and last difference signals associated with the RFID tag but did not occupy such an area when the computer received the difference signal with the lowest magnitude associated with the RFID tag.

At step 512, computer 26 defines three spots within memory to store three package structures to which the given RFID tag has been associated as set forth above. The slots are defined such that the slots represent the order of priority that computer 26 uses to assign the RFID tag to a specific package structure and, thus, the corresponding package, by the manner described below. In other words, computer 26 sets aside spots for three package structures, to which computer 26 may assign the RFID tag after the computer completes the process described below.

For each package structure identified at step 502, computer 26 repeats the following process. It should be understood that the identified package structures may be processed in any desired order. At step 514, computer 26 selects a package structure from those identified at step 502. Once a package is selected, computer 26 selects at step 516 the first memory slot for analysis and then repeats the process described below for each of the remaining slots. At step 518, computer 26 determines if a package structure occupies the selected slot and, if not, computer 26 stores the current package structure in the slot, at step 520. At step 522, computer 26 determines if there are any more of the package structures identified at 502 to be analyzed and, if so, process flow then loops back to step 514, where computer 26 selects the next package structure to be analyzed from those identified at step 502. At step 524, computer 26 determines if there are any more of the RFID tags identified at step 500 to be analyzed and, if so, process flow then loops back to step 502 where computer 26 selects the next RFID tag to be analyzed from those identified at step 500. If there are no more RFID tags to be analyzed, process flow continues to process "B" as described below.

If computer 26 determines at step 518 that the selected spot is occupied, process flow continues to step 526, where computer 26 compares the confidence rating of the package structure stored in the selected slot to the confidence rating of the current package for the tag. If the confidence rating of the current package is greater than that of the package structure stored in the selected slot, computer 26 replaces the package structure in the selected slot with the current package, at step 528. At step 530, computer 26 identifies the package structure replaced at step 528 and that no longer occupies the selected slot as the current package. At step 532, computer 26 determines if there are any more slots within memory that need to be analyzed, and, if so, process flow loops back to step 516 where the next slot is selected. If there are no more memory slots to be analyzed, process flow proceeds to step 522 and continues as described above.

If computer 26 determines that the confidence rating of the current package is not greater than that of the package structure in the selected slot, computer 26 determines whether the confidence ratings are equal, at step 534. If not, process flow proceeds to step 532 and continues as described above. If the confidence ratings are equal, computer 26 determines the number of responses comparing difference signals (received from antenna 38, 40, or 42) for the RFID tag that has been associated with the current package structure and the number of difference signals that has been stored for the package structure stored in the selected slot and compares these numbers, at step 536. If more difference signals are associated with the current package structure, process flow proceeds to step 528 and continues as described above. Otherwise, process flow continues to step 538, where computer 26 determines whether the number of difference signals for this RFID tag associated with the current package is equal to the number of difference signals associated with the package structure located in the selected slot. If the two numbers of responses are equal, process flow proceeds to step 532 and continues as described above. Otherwise, process flow proceeds to step 540, where computer 26 identifies the total number of responses from this RFID tag received from the bottom antenna or any other antennas other than those that generate difference signals. Computer 26 compares the number of these signals associated with the current package to the number of such signals associated with the package structure in the current slot. If the total number of such signals received from the specific RFID tag associated with the current package are less than those associated with the package structure in the current slot, process flow proceeds to step 532 and continues as described above. Otherwise, process flow proceeds to step 528 and continues as described above. The process described with respect to FIG. 14A then repeats for other RFID tags, if any, associated with the present package.

It should be understood that the above-described process may be altered depending on certain factors, such as the weight applied to the confidence ratings or applied to the number of stored responses from a specific RFID tag received by an antenna that does not generate difference signals in response to signals received from the tag. For example, computer 26 may value the number of responses associated with a package from non-difference signal-generating antennas, such as bottom antenna 36, more than the value placed on the confidence ratings established by the process described above. Accordingly, a package structure associated with a specific RFID tag may be placed in slot 1 based on the number of signals associated to the package structure received from the tag by a non-difference signal-generating antenna. If the number of signals associated to one package is equal to the number of signals associated to another package, the system may assign the corresponding RFID tag to one of the packages based on a confidence rating assigned from an analysis of the difference signals associated with each package as set forth above. It should be understood that whether a number of signals associated to one package is analogous to a number of signals associated to another package may vary for each conveyor system. For example, the difference between the two numbers of signals may have a greater significance for a low speed conveyor system as compared to a high speed conveyor system.

In process "B," computer 26 assigns the RFID tags associated with the package structure corresponding to the package that has reached the transmit point (i.e., the predetermined point downstream from the antenna tunnel along path of travel 22). In the present embodiment, if the package structure occupies the highest slot described above with respect to an RFID tag, that tag is assigned to the structure. If the package structure occupies slots corresponding to multiple RFID tags, the tag corresponding to the highest slot occupied by the package structure is assigned to the structure. If the slot occupied by the package structure for the multiple RFID tags is the same, the tag that is associated with the package the greatest number of times (as indicated by the number of associations of tag response records to the structure) is assigned to the package structure. If the package structure does not occupy any slot with respect to any RFID tag, computer 26 indicates the package as such by identifying the package structure as "no tag." The operator of the conveyor system may remove such packages and attempt to manually read any RFID tags located thereon.

Once computer 26 assigns a particular RFID tag to a package structure id, tracking thread 70 removes the record corresponding to the RFID tag, thereby removing any association to other package structures, so that the RFID tag is not included in any additional processing. In addition, computer 26 may transmit the package structure (including the assigned RFID tag information) to a host computer and removes the package structure from package queue 86 (FIG. 1B). In one embodiment, this occurs when the package reaches the transmit point or, alternatively, at the point when the RFID tag is assigned to the package structure id.

Figure 14B:
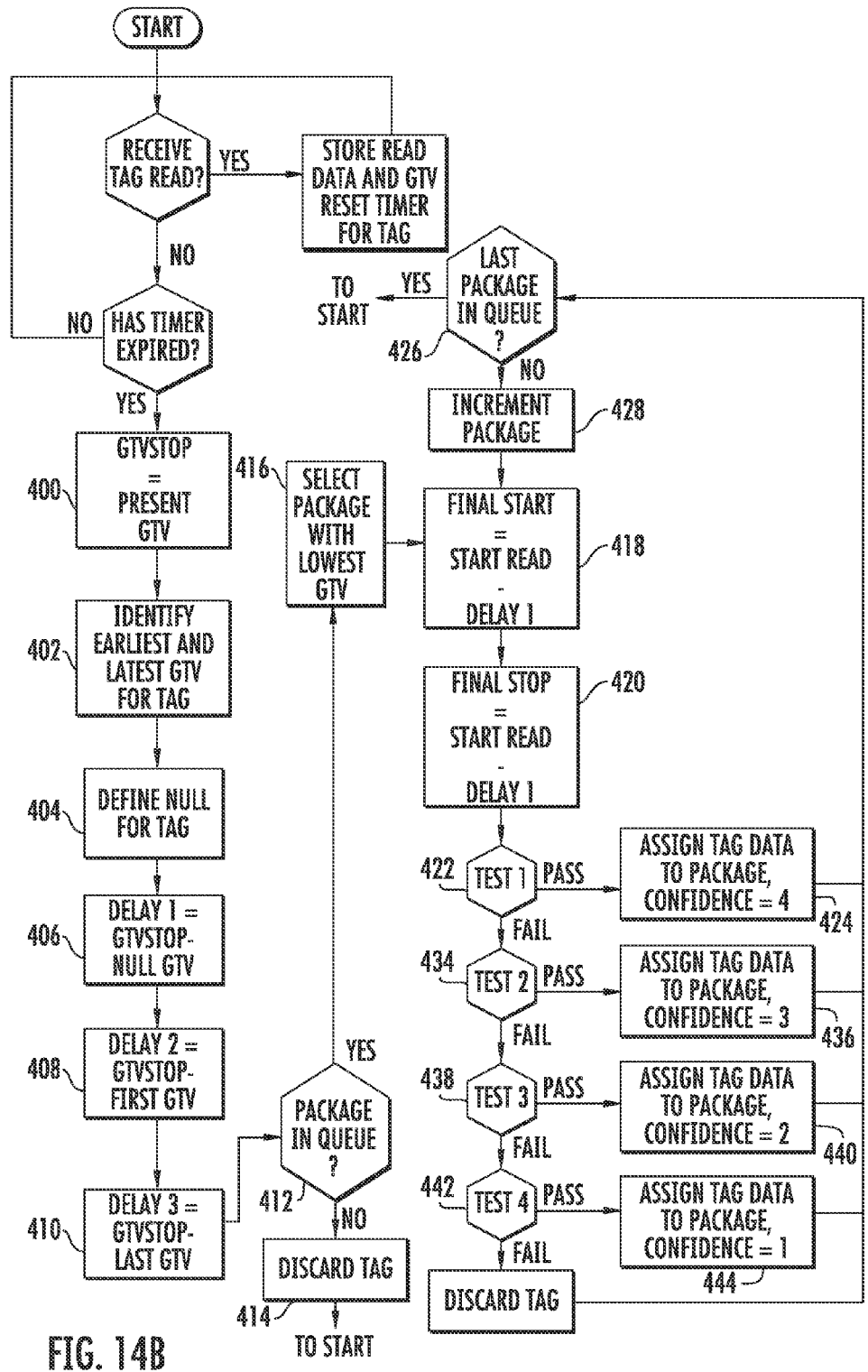

FIG. 14B describes an algorithm executed by tracking thread 70 in another embodiment in which the system relies only on the difference signal from device 47 (FIG. 5A or 5B), so that the computer assigns RFID tag data to a given package based on the package's proximity to line 138 when the difference signal reaches a minimum. Tag responses are stored in the manner described above. When computer 26 determines it has received all of the signals from a given RFID tag (i.e., when the predetermined time period expires without any reads received for the tag for the predetermined amount of time after having received reads for the tag), tracking thread 70 assigns the value of GTV 80 at the point when the time period expires to a variable GTVSTOP. As noted above, each stored tag response has an associated GTV value corresponding to the TAC value at the time the response was received. At step 402, tracking thread 70 identifies the smallest GTV assigned to data records for this RFID tag (as identified by its tag id data in the records) and the highest GTV, thereby identifying the "first" and "last" tag reads for the tag, respectively.

At step 404, tracking thread 70 analyzes the difference signals (i.e., the responses received from the side and top antennas) corresponding to the RFID tag reads between the first and last reads identified at step 402 to define a null. The "null value," as defined by the system in the presently described embodiment, is the GTV of the difference signal for the selected tag that exhibits the smallest magnitude (or a period when no difference signal is received) between two difference signals exhibiting greater magnitudes than the bounded signal. If no such scenario exists for a given RFID tag, or if more than one such scenario exists, tracking thread 70 averages the GTV for the first tag read with the last tag read and defines the result as the null value in one embodiment.

At step 406, tracking thread 70 determines the GTV at the null value and determines the difference between the null value GTV and GTVSTOP, assigning the result to a variable "Delay1." At step 408, a variable "Delay2" is the time (in TAC pulses) between the first read for this tag and GTVSTOP. At 410, a variable "Delay3" is the time (in TAC pulses) between the last read for this tag and GTVSTOP.

At step 412, tracking thread 70 checks queue flag 88 (FIG. 1B) to determine whether any packages are in the package queue, i.e., whether any packages are on the conveyor in the area that could include the antenna tunnel. If not, then the tag data is discarded at step 414, and the routine ends. If there is at least one package in the package queue, tracking thread 70 selects the package structure in the package queue having the lowest GTV record (i.e., the oldest, or most downstream, package in the queue). Tracking thread 70 then defines at step 418 a variable FINALSTART as the difference between the package's start read value 84 (FIG. 1B) and Delay1, and defines at step 420 a variable FINALSTOP as the difference between the package's stop read value 90 (FIG. 1B) and Delay1. Since start read value 84 (FIG. 1B) and stop read value 90 (FIG. 1B) increment at each TAC pulse, and since the algorithm illustrated in FIG. 14B executes at the expiration of the predetermined time after the last tag read for the subject tag, steps 418 and 420 determine the package's start read value and stop read value at the time the null occurred for the subject tag. Then, at step 422, tracking thread 70 determines if the null value occurred when the package was at a point in path 22 such that line 138 (FIGS. 6A and 6B) was between the front and back edges of the package. Since start read value 84 (FIG. 1B) is an incremental time or distance (in TAC pulses) from the time or position at which the front of the package was located at sensor 28 (FIG. 1A), FINALSTART represents the position of the package's leading edge from sensor 28 when the null occurs for the given tag. Similarly, FINAL-STOP represents the position of the package's trailing edge from sensor 28 when the null occurs for the given tag. As noted above, the tag is located at line 138 when the null occurs. The distance between sensor 28 and line 138 is known, and is stored by the processor as a variable DELTA. Thus, if DELTA is between FINALSTART and FINALSTOP, the package was at line 138 in the path of travel when the null occurred, and there is a likelihood that the tag was on the package. Thus, at step 422, if FINALSTOP≤DELTA≤FINALSTART, then tracking thread 70 associates the RFID tag to this package at step 424 by storing the tag data from the received signal within the package structure corresponding to this package within package queue 86, along with a confidence rating of 4. A confidence rating indicates the degree of certainty that the tracking system has associated the RFID tag with the correct package based on the package's location relative to line 138 at the time when the signals transmitted by the RFID tag were received by the antenna.

At step 426, the tracking thread then checks whether this package was the last package in package queue 86. If so, the procedure ends. If not, tracking thread proceeds to the package record with the next highest GTV at step 428, and repeats the procedure beginning at step 418.

If the test at step 422 fails, then the subject package was not on line 138 when the tag null occurred. Tracking thread 70 then determines at step 434 if the null value occurred when the package was at a point in path 22 such that the package's rearmost edge was beyond the point in the path of travel at which the first tag read occurred and the package's forward most edge was before the point in the path of travel at which the last tag read occurred. Put another way, considering that the series of reads for the tag occurred at specific positions in the path of travel, tracking thread 70 determines at step 434 if the package was entirely within this region during the period when the null occurred. Given that the null occurred at a position (in TAC pulses) from the sensor 28 equal to DELTA, that Delay1 is the distance (in TAC pulses) from GTVSTOP to line 138, and that Delay2 is the distance (in TAC pulses) from GTVSTOP to the point at which the first tag read occurred, the distance from sensor 28 to the point at which the first tag read occurred is DELTA−(Delay2−Delay1). Given that Delay3 is the distance (in TAC pulses) from GTVSTOP to the point at which the last tag read occurred, the distance from sensor 28 to the point at which the last tag read occurred is DELTA+(Delay1−Delay3). Thus, if FINALSTART≤DELTA+(Delay1−Delay3), the front end of the package was within this region when the null occurred, and if FINALSTOP≥DELTA−(Delay2−Delay1), the back end of the package was within this region when the null occurred. Tracking thread 70 executes both tests for the package at step 434. If the package passes both, the package was entirely within this region when the null occurred, although not at line 138, and there is a likelihood, although lesser than the likelihood if the null occurred when the package was on line 138, that the tag was on the package. Thus, if the test is passed at step 434, tracking thread 70 associates the RFID tag to this package at step 436, along with a confidence rating of 3. Tracking thread 70 then returns to step 426 and repeats the process.

If either of the two tests fail at step 434, then tracking thread 70 determines at step 438 if the null value occurred when the package was at a point in path 22 such that any part of the package was beyond the point in the path of travel at which the first tag read occurred and within the point in the path of travel at which the last tag read occurred. Put another way, tracking thread 70 determines at step 438 if the package was at least partly within this region during the period when the null occurred. Thus, if FINALSTART≥DELTA−(Delay2−Delay1), and if FINALSTOP≤DELTA+(Delay1−Delay3), at least a part of the package was within this region when the null occurred. The tracking thread executes both tests for the package at step 438. If the package passes both, there is a lesser likelihood that the tag was on the package. Thus, if the test is passed at step 438, tracking thread 70 associates the RFID tag to this package at step 440, along with a confidence rating of 2. Tracking thread 70 then returns to step 426 and repeats the process.

If either of the two tests fail at step 438, then tracking thread 70 determines at step 442 if the null value occurred when the package was at a point in path 22 such that any part of the package was beyond the point in the path of travel within a predetermined distance in front of the point at which the first tag read occurred and within a predetermined distance beyond the point in the path of travel at which the last tag read occurred. Put another way, tracking thread 70 determines at step 442 if the package was at least partly within this region during the period when the null occurred. Thus, if FINALSTART≥DELTA−(Delay2−Delay1)−FRONTOFFSET, and if FINALSTOP≤DELTA+(Delay1−Delay3)+BACKOFFSET, at least a part of the package was within this region when the null occurred. The tracking thread executes both tests for the package at step 442. If the package passes both, there is a lesser likelihood that the tag was on the package. Thus, if the test is passed at step 442, tracking thread 70 associates the RFID tag to this package at step 444, along with a confidence rating of 1. Tracking thread 70 then returns to step 426 and repeats the process. If both tests fail at step 442, the RFID tag data is not associated with the package structure, and the process flow continues to step 426. If the process passes through all package structures in the package queue without assigning the tag data to a package, the tag data is discarded.

It should be understood that the FRONTOFFSET and BACKOFFSET values may vary depending on certain factors of the conveyor system, such as conveyor speed, spacing between packages traveling on the conveyor system, and spacing between the antennas along the conveyor system.

When tracking thread 70 determines that start read value 84 (FIG. 1B) for any given package structure increments to a value equal to a stored value corresponding to the distance between sensor 28 and a transmit point 87 (FIG. 1A) (i.e., the package corresponding to the package structure has reached the transmit point), the tracking thread compares the confidence rating for each RFID tag stored in that package structure with the confidence rating for the same tag stored in any subsequent (i.e., upstream) package structure in the package queue. If the confidence rating for the tag in the present package structure is equal to or higher than the confidence rating for the same tag in all the upstream package structures in which the same tag occurs, the tag data is retained in the present package structure and removed from the upstream package structures. If the confidence rating for the tag in the present package structure is lower than the confidence rating for the same tag in any upstream package structure, the tag data is removed from the present package structure. In one embodiment, the tracking thread then checks all remaining tag data in the present package structure. If there is tag data for multiple different RFID tag id's, the tracking thread retains the tag data having the highest confidence rating and removes tag data corresponding to any lower confidence rating. If multiple tags have the same, highest confidence rating, the tracking thread retains those multiple tags. In another embodiment, the tracking thread does not attempt to eliminate multiple tags on the present package structure. After confirming RFID tags on the present package structure, the processor transmits the package structure data to a host processor (not shown) that controls other conveyor systems in the facility, and the package structure is removed from the package queue.

Figure 14C:
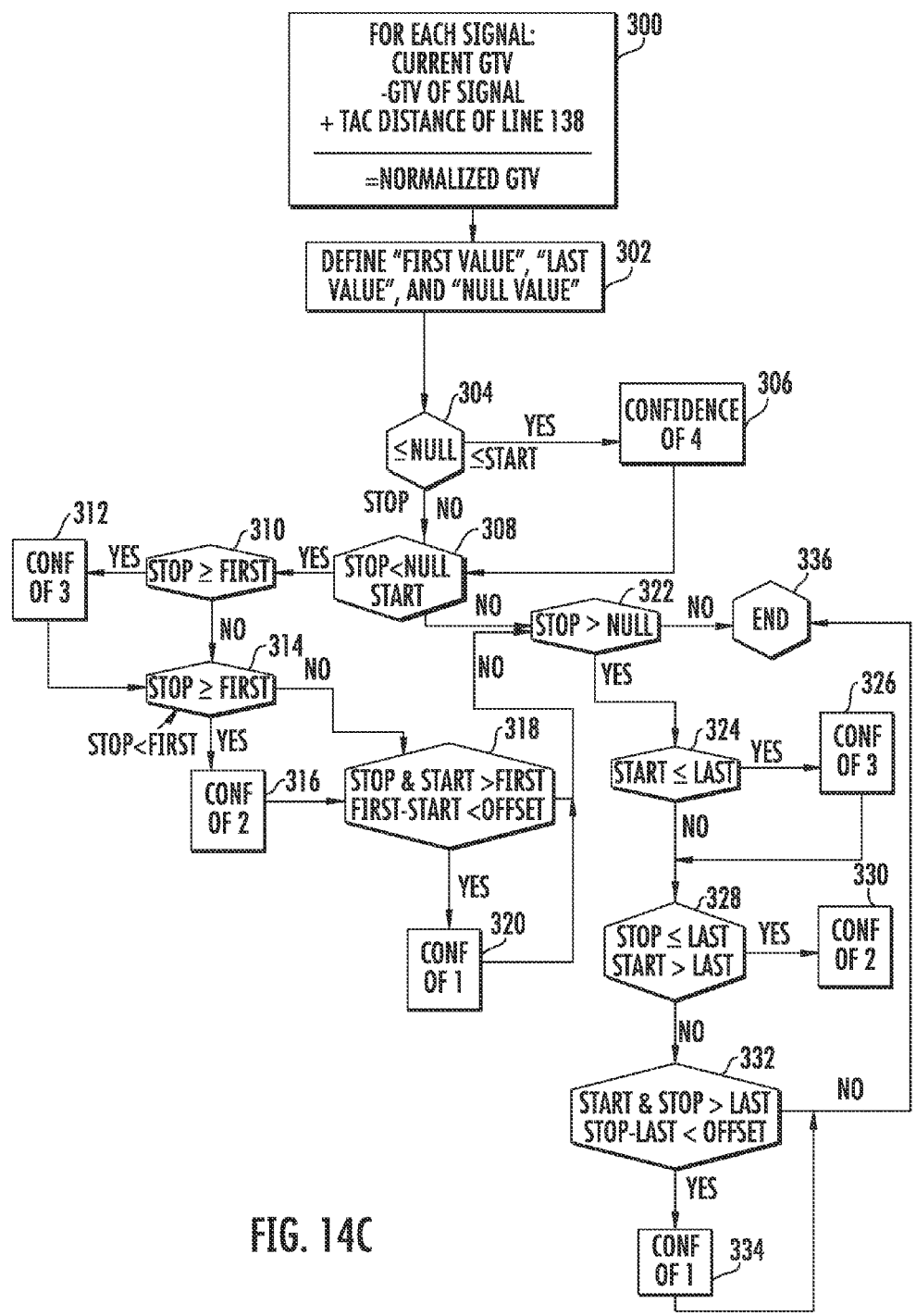

FIG. 14C describes an algorithm applicable to yet another embodiment in which the system relies only on the difference signal. After computer 26 (FIG. 1A) determines it has received all of the signals from a given RFID tag, the computer subtracts the GTV associated with each stored signal corresponding to that tag from the current value of GTV 80 (FIG. 1B), and adds the value associated with the distance between line 138 and photodetector 28, at step 300. The resulting value (referred to as "the normalized GTV" for each signal) is the location, at a given time along conveyor belt 14, of the receipt of the signal relative to other events that occur along the conveyor, such as the physical location of packages or the receipt of other signals. As a result, tracking thread 70 is able to compare the receipt of each signal to the physical location of the packages. The determination that system 10 has received all relevant signals from a given RFID tag may be based on the expiration of a timer, as explained above, in one embodiment.

At step 302, tracking thread 70 defines the value of the smallest normalized GTV as the "first value" and the value of the largest normalized GTV as the "last value." Tracking thread 70 analyzes the difference signals corresponding to the RFID tag to define a null. The "null value," as defined by the system in the presently-described embodiment, is the normalized GTV of the difference signal exhibiting the smallest magnitude (or a period when no difference signal is received) between two difference signals exhibiting greater magnitudes than the bounded signal. If no such scenario exists for a given RFID tag, or if more than one such scenario exists, tracking thread 70 averages the "first value" and "last value" and defines the result as the "null value."

At step 304, tracking thread 70 identifies any package structure within package queue 86 (FIG. 1B) where the null value is both greater than or equal to the stop read value 90 (FIG. 1B) and less than or equal to the start read value 84 (FIG. 1B) of the package structure. If so, this indicates that the RFID tag associated with the signal corresponding to the null value was received at the same time a portion of the package identified at step 302 occupied an area of conveyor belt 14 that included line 138 (FIG. 6B). At step 306, tracking thread 70 associates the RFID tag to this package by storing the tag data from the received signal within the package structure corresponding to the package within package queue 86, along with a confidence rating of 4. A confidence rating indicates the degree of certainty that tracking system 70 has associated the RFID tag to the correct package based on the location of the package relative to line 138 at the time when the signals transmitted by the RFID tag were received by the antenna.

At step 308, tracking thread 70 identifies any package structures within package queue 86 (FIG. 1B) where the null value is greater than the start read value 84 (FIG. 1B) of the package structure. At step 310, tracking thread 70 identifies any package structures from the structures identified at step 308 where the stop read value 90 (FIG. 1B) is greater than or equal to the first value. If so, this indicates that the package associated with any such package structure was upstream of line 138 when the null occurred but that the entirety of the package was sufficiently within an area tracking thread 70 associates with the electromagnetic field radiated by the receiving antenna so that an RFID tag on the package could have responded to a query signal from the antenna. At step 312, the RFID tag is associated with any package structures identified at step 310, with a confidence rating of 3.

If the stop read value 90 of any package structure identified at step 308 is not greater than or equal to the first value, tracking thread 70 identifies any package structure of those identified at step 308 where the start read value 84 of the package is greater than or equal to the first value at step 314. This indicates that the package associated with any such package structure was upstream of line 138 but less than the entirety of the package was within the area associated with the electromagnetic field radiated by the receiving antenna so that an RFID tag on a portion of the package could have responded to a query signal from the antenna. Thus, the RFID tag is associated to such a package structure and assigned a confidence rating of 2 at step 316.

At step 318, tracking thread 70 identifies any package structures of those identified at step 308 where the start read value 84 and stop read value 90 are both less than the first value and the difference between the start read value 84 and the first value is less than or equal to a predefined offset value. This indicates the package(s) associated with any package structure identified at step 314 was upstream of line 138, and that the entirety of the package was entirely outside the area associated with the electromagnetic field radiated by the receiving antenna but within an acceptable range of the field when the signal was received. The predefined distance (or offset) may be defined by the system administrator depending on the characteristics and desired operation of the conveyor system. At step 320, the RFID tag is associated with any package structure identified at step 318 and assigned a confidence rating of 1. If no package structure is identified at step 318 the RFID tag is not associated to any package structure that was identified at step 308, and process flow continues to step 322.

At step 320, tracking thread 70 identifies any package structure within package queue 86 (FIG. 1B) where the stop value 90 (FIG. 1B) is greater than the null value. If so, tracking thread 70 determines at step 324 whether the start read value 84 (FIG. 1B) of any package structure identified at step 322 is less than or equal to the last value. If so, this indicates that the package associated with any such package structure identified at step 324 was downstream of line 138 but that the entirety of the package was sufficiently within the area associated with the electromagnetic field radiated by the receiving antenna so that an RFID tag on the package could have responded to a query signal from the antenna. The RFID tag is then associated with any package structure identified at step 324 and assigned a confidence rating of 3 at step 326.

At step 328, tracking thread 70 identifies any package structure of the structures identified at step 322 where the last value is less than the start value 86 and greater than or equal to the stop value 90 of the package. This indicates that the package associated with any such package structure was downstream of line 138 but less than the entirety of the package was within an area associated with the electromagnetic field radiated by the receiving antenna so that an RFID tag on a portion of the package could have responded to a query signal from the antenna. Thus, the RFID tag is associated to such a package structure and assigned a confidence rating of 2 at step 330.

At step 332, tracking thread 70 identifies any package structures of those identified at step 322 where the stop read value 90 and the start read value 84 are both greater than the last value are and the difference between the stop read value and the first value is less than or equal to a predefined offset value. If so, this indicates the package(s) associated with any package structure identified at step 332 was downstream of line 138, and that the entirety of the package was outside the area associated with the electromagnetic field radiated by the receiving antenna but within an acceptable range of the field when the signal was received. The RFID tag is associated with any such package and assigned a confidence rating of 1 at step 334. It should be understood that the offset value described above may vary depending on certain factors of the conveyor system, such as conveyor speed, spacing between packages traveling on the conveyor system, and spacing between the antennas along the conveyor system. Process flow then terminates at step 336.

Figure 7:
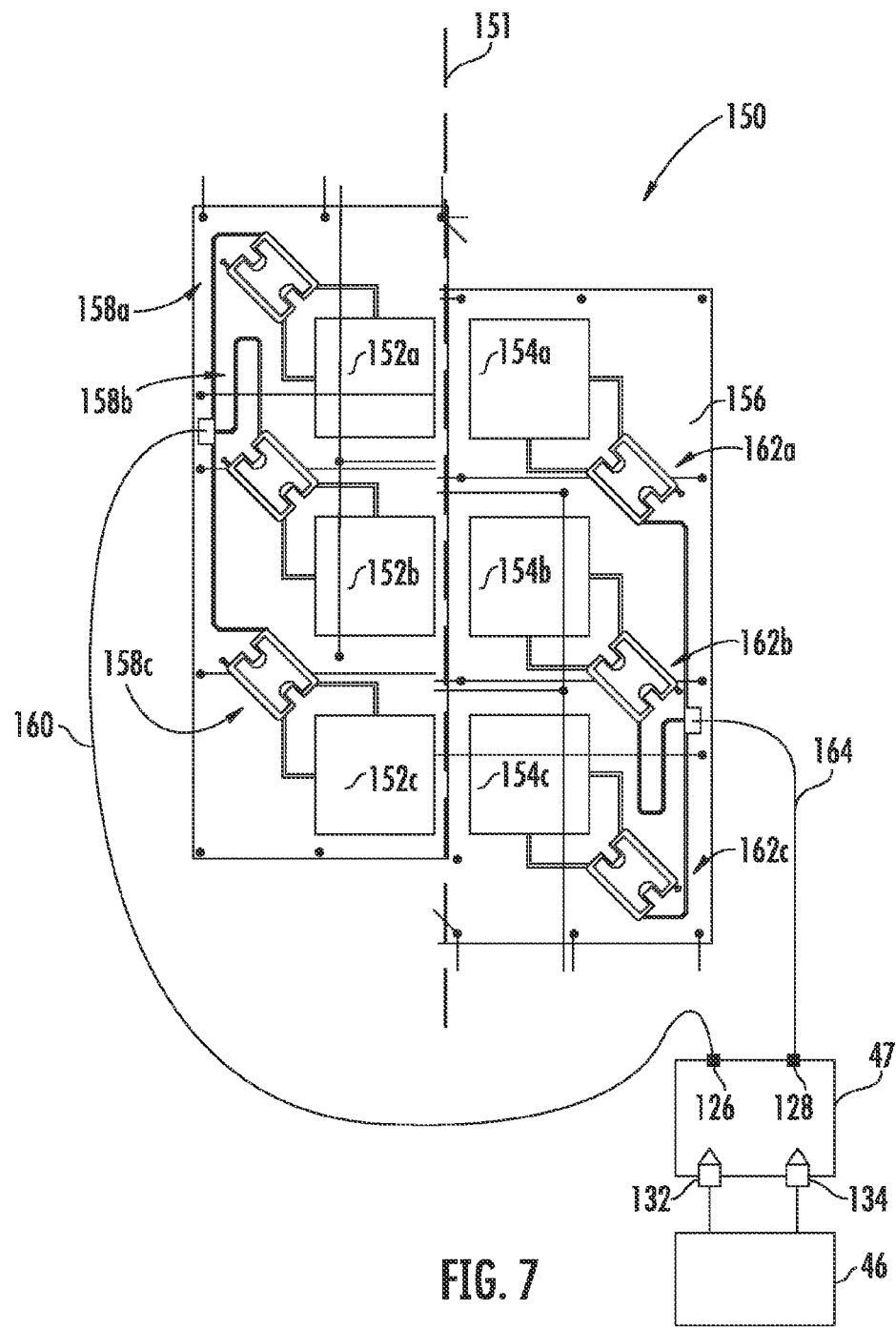
FIG. 7 is a schematic representation of a patch antenna in accordance with an embodiment of the present invention.

In another embodiment, antennas 38, 40, and 42 are patch antennas comprised of six patch elements. FIG. 7 illustrates such an antenna 150 comprised of three patch elements 152 disposed opposite three identical patch elements 154 on a dielectric substrate 156 such that elements 152 are aligned symmetrically to elements 154 and opposite each other across a center dividing line 151. Patch elements 152 are connected to a sum/difference device 47 via a feed network 158 and a communication line 160 at a port 126, while patch elements 154 are connected to device 47 via a feed network 162 and a communication line 164 at a port 128. Sum/difference device 47 includes two output ports: a sum port 132 and a difference port 134. Antenna 150 may replace, and therefore have a similar orientation of, side antennas 40 and 42 (FIG. 1A) such that a line defined by the intersection of a plane defined by patch elements 152 and 154 and a plane defined by conveyor belt 14 is parallel to direction of travel 22. Antenna 150 is oriented so that patch elements 152a, 152b, and 152c are aligned vertically with respect to each other, and patch elements 154a, 154b, and 154c are aligned vertically with respect to each other, assuming the conveyor belt defines a horizontal plane. Line 151 is vertical and perpendicular to the direction of travel 22 (FIG. 1A). Thus, patch elements 152 lead (i.e., are downstream from) patch elements 154 in the direction of path of travel 22. A plane separating patch elements 152 and patch elements 154 and that includes separator line 151 is perpendicular to direction of travel 22 of the conveyor belt. The radiation pattern emitted by antenna 150 is symmetric about this plane similar to the description of line 138 described above with respect to FIG. 5A. Antenna 150 may replace and be oriented similar to top antenna 38 such that a plane defined by patch elements 152 and 154 is parallel to a plane defined by conveyor belt 14. In this configuration, patch elements 152a, 152b, and 152c are aligned traverse to direction of travel 22, as are patch elements 154a, 154b, and 154c. Patch elements 152 are opposite patch elements 154 with reference to direction of travel 22, such that one row of patch elements is upstream from the other row of patch elements.

The construction and operation of sum/difference device 47 is identical to that of the sum/difference device described above with reference to FIGS. 5A, 6A, and 6B such that the device supplies a signal to patch elements 152 and 154 through respective ports 126 and 128, feed lines 160 and 164, and feed networks 158 and 162. Antenna 150 radiates an electromagnetic field in response to the signal supplied by sum/difference device 47 to patch elements 152 and 154. RFID tags located within or passing through the radiated field are energized and produce a responsive signal. As described above, some or all of patch elements 152 and 154 may receive a number of responses from the RFID tag depending on the distance between the patch element and the tag. Signals received by patch elements 152 are transmitted via feed network 158 and communication line 160 to port 126 of sum/difference device 47, while signals received by patch elements 154 are transmitted via feed network 162 and communication line 164 to device port 128.

Sum/difference device 47 produces sum signals on port 132 and difference signals on port 134 from the signals received on ports 128 and 130 in the same manner as described in detail above. Ports 132 and 134 are operatively connected to computer 26 (FIG. 1A) via engine 46 such that the computer is able to receive and analyze the signals produced by device 47 in the same manner to that described above with respect to FIGS. 5A, 6A, and 6B. In another embodiment where signals are analyzed as discussed with respect to FIGS. 14A, 14B, and 14C, for example, only port 134 is operatively connected to computer 26 such that the computer only receives and analyzes the difference signals produced by device 47 in a manner consistent with the above description.

Figure 5B:
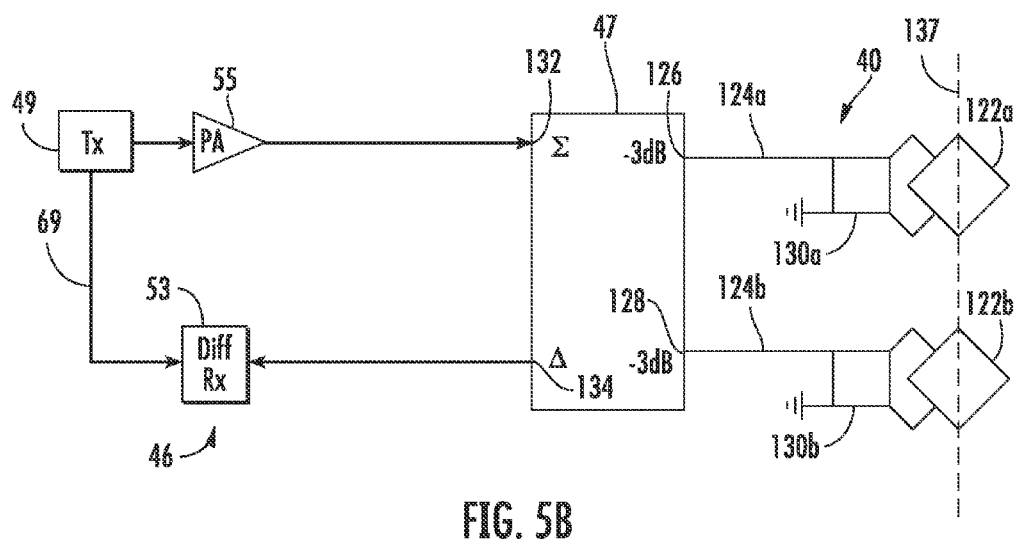

It should be understood that the radiation pattern transmitted by antenna 150 extends further in the direction of the two additional pairs of patches in comparison to the radiation pattern transmitted by antenna 40 (FIGS. 5A and 5B). For example, the radiation pattern transmitted by antenna 150 extends further in the Z direction when used as a side antenna (and in the X direction when used as the top antenna) in comparison to the radiation pattern transmitted by antenna 40 (FIGS. 5A and 5B). Such a radiation pattern allows antenna 150 to receive responses from tags located closer to the top surface of a package (when used as a side antenna) or located nearer to portions of the package adjacent to the sides of the conveyor (when used as the top antenna) in comparison to the radiation pattern emitted by antenna 40 (FIGS. 5A and 5B).

Figure 8:
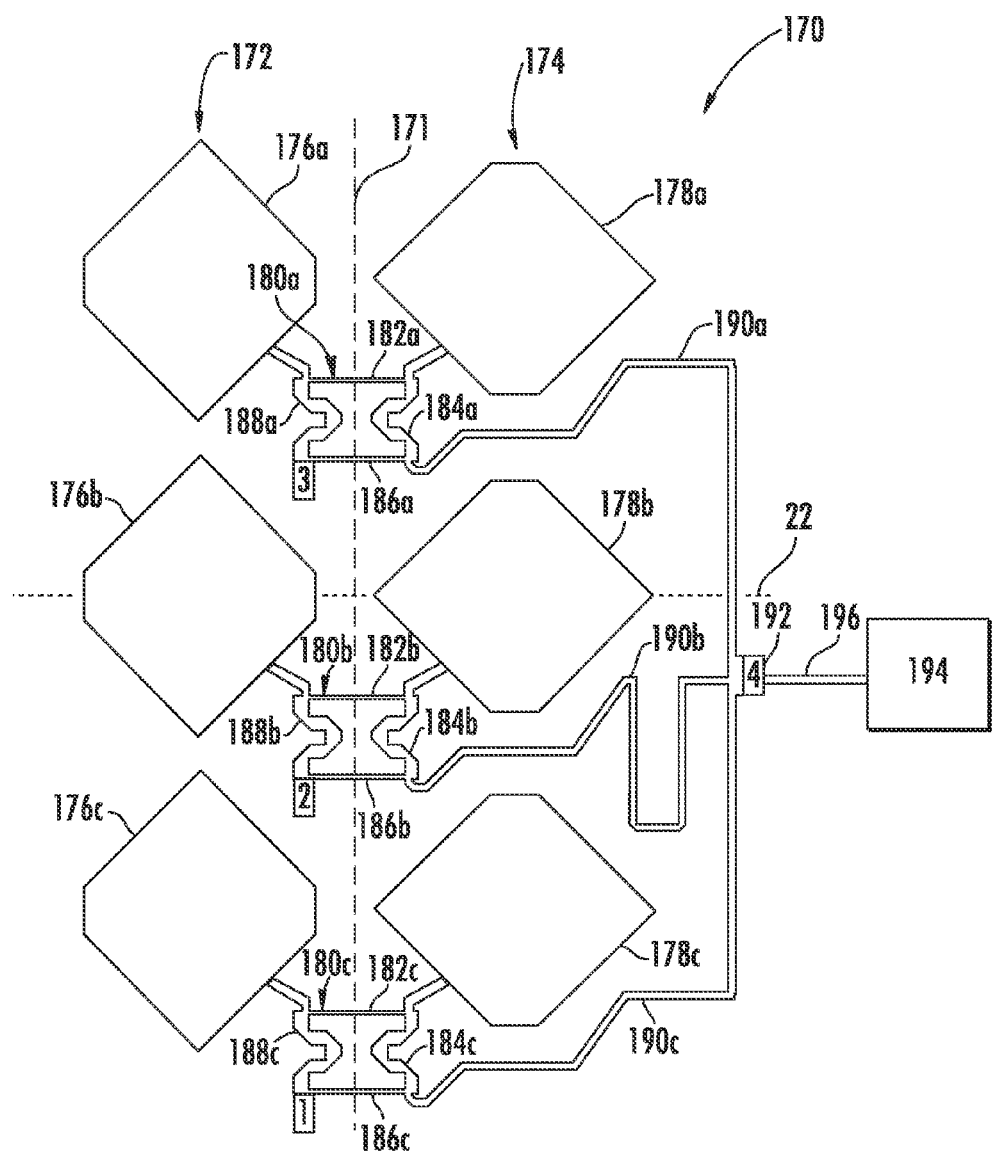
FIG. 8 is a schematic representation of a patch antenna in accordance with an embodiment of the present invention.

FIG. 8 illustrates a bottom read antenna 170 comprised of two parallel columns 172 and 174 each having three patch elements 176 and 178, respectively. Each adjacent pair of patch elements 176 and 178 is connected to a hybrid network 180 located between the pair of patch elements. Hybrid networks 180 are identical to each other in configuration and construction and are defined by four sides 182, 184, 186, and 188. Feed lines 190 connect hybrid networks 180 to an entry point 192 and are also identical to each other in resistance, length, and construction. An antenna engine 194 is operatively connected to entry point 192 via a communication line 196. Referring to FIGS. 1A and 8, antenna 170 may replace bottom antenna 36 so that antenna 170 is located beneath and parallel to conveyor belt 14. In this configuration, patch elements 176 are opposite patch elements 178 with respect to direction of travel 22. That is, line 171 is transverse to direction of travel 22.

In operation, antenna engine 194 supplies a signal via communication line 196 to feed lines 190, which supply the signal to hybrid networks 180. Because feed lines 190 are identical, the signals supplied to hybrid networks 180 are also identical. The lengths of sides 182, 184, 186, and 188 are also identical, and each corresponds to a quarter wavelength of the signal applied to hybrid network 180. The signals travel along sides 186 and 188 before being applied to patch elements 176. The signals travel along sides 184 before being applied to opposing patch elements 178. As a result, the signals applied to patch elements 176 are shifted in phase by 90° with respect to the signals applied to patch elements 178. Additionally, each feed line that connects to a side of a patch element 176 does so at a side of the patch offset 90° (considered with respect to an axis through the center of the patch and extending into and out of the page of FIG. 8) with respect to the side of each patch element 178 to which the feed lines attach. The clipped corners of patch elements 178 are also offset 90° from the positions of the clipped corners of the patch elements 178, such that the individual patch elements 176 may be considered rotated by 90° with respect to the individual patch elements 178. Due to the orientation of the clipped corners on each patch with respect to the connection point of the patch's feed line to the patch, and therefore the rotational direction of the electric current on the patches, this causes the rotational electric current pattern and the radiation patterns emitted by patch elements 176 to exhibit another 90° phase-shift and, thus, a combined 180° phase-shift as compared to the current patterns of and radiation patterns emitted by patch elements 178. As a result, bottom antenna 170 produces a radiation pattern similar to pattern 198 as exemplified in FIG. 9.

Figure 9:
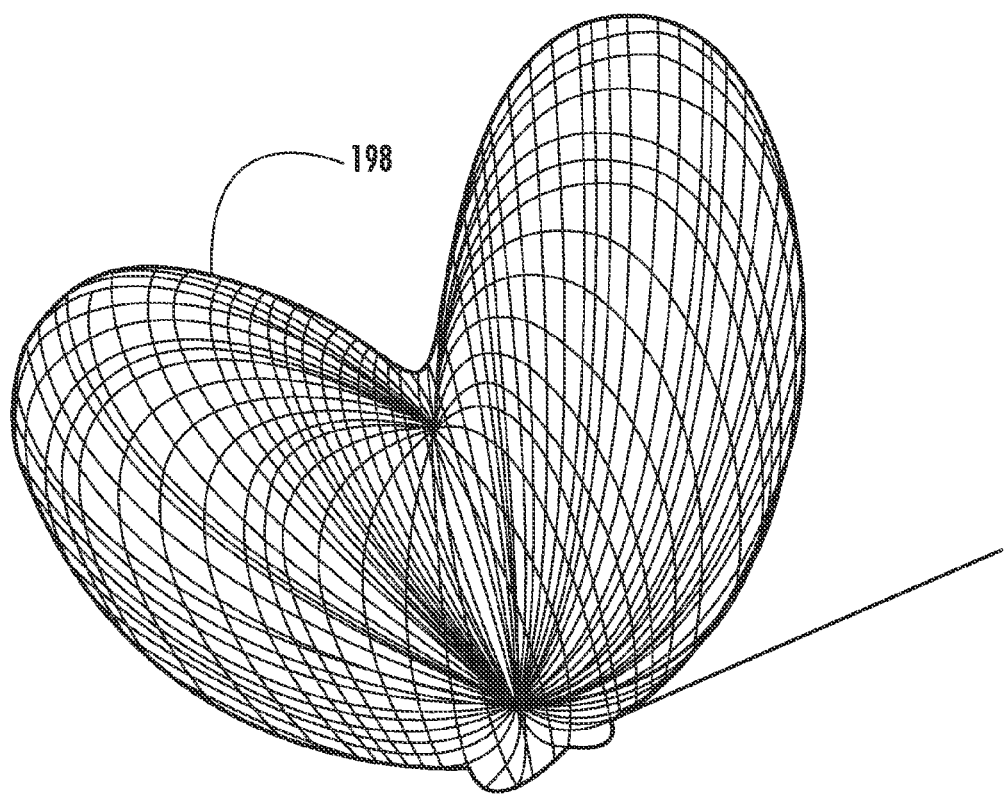
FIG. 9 is a graphic representation of a radiation pattern produced by the patch antenna of FIG. 8.

Referring to FIGS. 1A and 9, radiation pattern 198 exhibits two relatively large lobes, each extending slightly away from the center of the pattern. When bottom antenna 170 (FIG. 8) is placed beneath conveyor belt 14, these lobes extend in the upstream and downstream direction (the Y direction), respectively, and occupy a relatively large area directly above the antenna. As a result, bottom antenna 170 is able to send and receive radio signals to and from a greater area through which belt 14 transports packages. This orientation of the radiation pattern emitted by bottom antenna 170 facilitates sending and receiving radio signals to and from RFID tags located on the front and rear surfaces of packages conveyed by the belt. This may be problematic when the speed of conveyor belt 14 or the spacing between adjacent packages on the belt are such that multiple RFID tags may occupy the area covered by radiation pattern 198 at approximately the same time. As such, bottom antenna 170 may simultaneously receive responses from multiple RFID tags located on adjacent packages, thereby complicating the ability of computer 26 and tracking thread 70 (FIG. 1B) to assign an RFID tag to the correct package.

Use of bottom antenna 170 may be preferable, however, when there is a sufficient distance between adjacent packages so as to reduce the likelihood that the radiation pattern emitted by the antenna will send and receive signals from RFID tags located on packages outside the desired area. That is, due to the size of the radiation pattern and its ability to facilitate sending and receiving signals to and from RFID tags located on the front and rear surfaces of the packages, use of antenna 170 may be preferable when there is a sufficient gap between adjacent packages.

Figure 10:
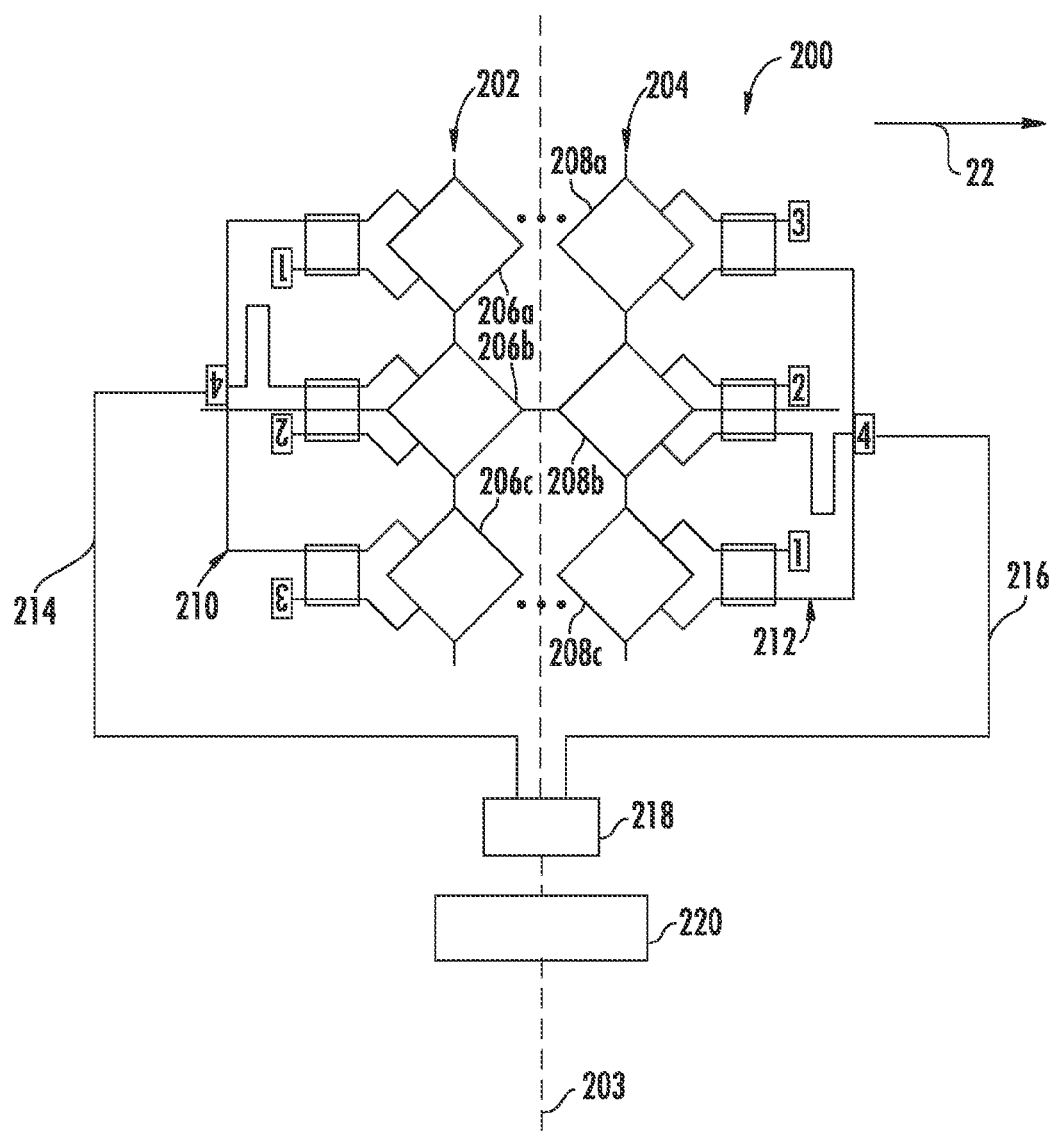
FIG. 10 is a schematic representation of a patch antenna in accordance with an embodiment of the present invention.

FIG. 10 illustrates a bottom antenna 200 in accordance with another embodiment of the present invention. Bottom antenna 200 is comprised of a three-patch element antenna 202 located opposite another three-patch element antenna 204 with respect to a line 203. Antenna 202 and antenna 204 comprise respective three patch elements 206 and 208, which are connected to respective feed networks 210 and 212. Feed lines 214 and 216 connect respective feed networks 210 and 212 to a power splitter 218, which is operatively connected to an antenna engine 220. Each component of antenna 202 and the corresponding component of antenna 204 are identical in construction, resistance, conductivity, and size. In the presently-described embodiment, antenna 200 is located beneath and parallel to conveyor belt 14 in an orientation such that patch elements 206 are opposite patch elements 208 with respect to direction of travel 22, and line 203 is transverse to direction 22.

In operation, antenna engine 220 supplies a signal to power splitter 218, which transmits the signal evenly to feed lines 214 and 216. Because feed lines 214 and 216 are identical, the signals supplied to feed networks 210 and 212 by the respective feed lines are identical. Although feed networks 210 and 212 are also identical, feed network 210 applies the signal to the top left side of a square connector to each patch element 206, while feed network 212 applies the signal to the opposite (bottom right) side of a square connector to each patch element 208. Because the result by electric current rotational direction is the same in both rows, and because the feed lines from the square connectors attach to the opposite sides (with respect to line 203) of patch elements 206 than the feed lines connect to patch 208, the electric current patterns on, and the radiation patterns emitted by, patch elements 208 are 180° out of phase when compared to the electric current patterns on, and the radiation patterns emitted by, patch elements 206. This produces a radiation pattern similar to radiation pattern 198 as exemplified in FIG. 9 comprising two relatively large lobes covering a relatively considerable area above conveyor belt 14. As described above, it may be preferable to use a bottom antenna that produces radiation pattern 198 in different embodiments of the present invention.

Figure 11:
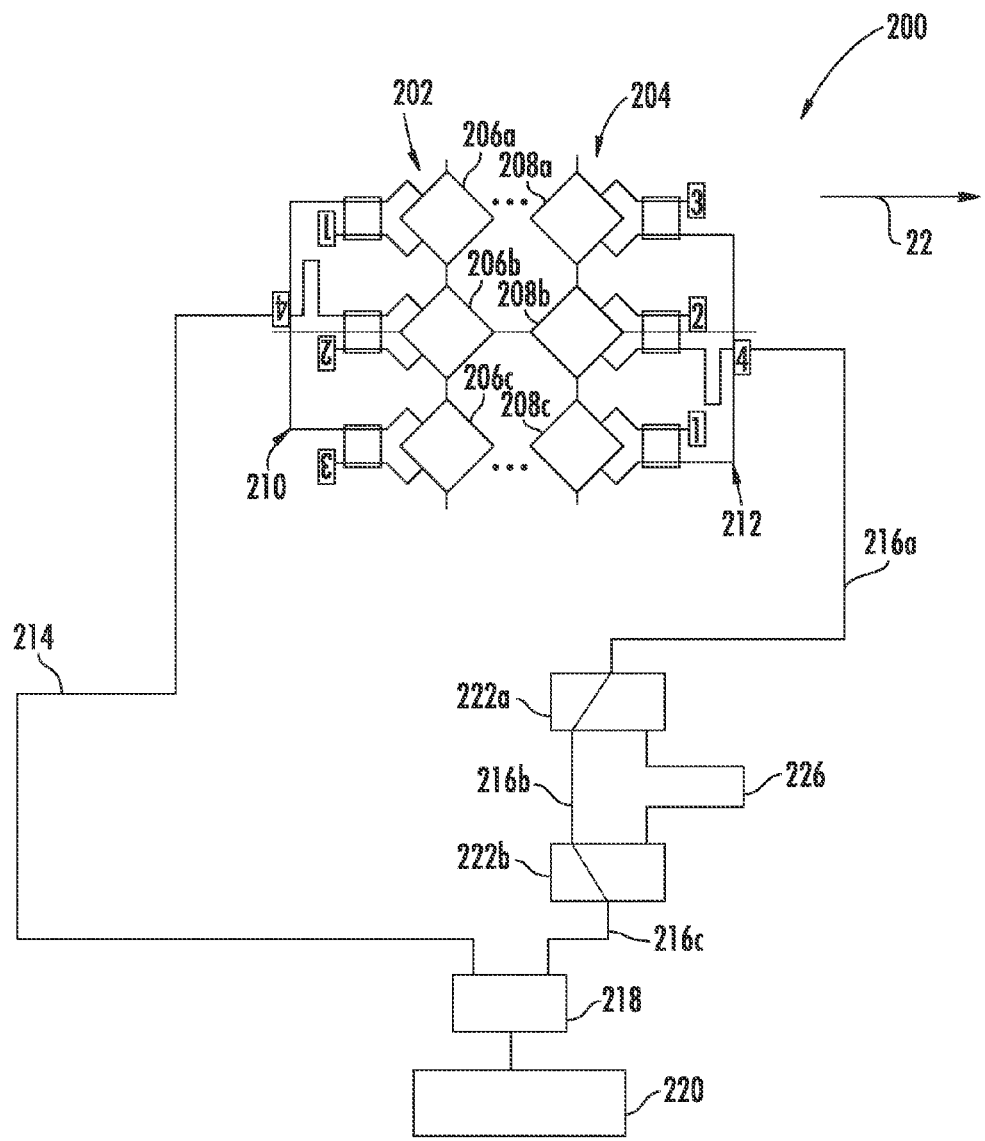
FIG. 11 is a schematic representation of a patch antenna in accordance with an embodiment of the present invention.
Figure 12:
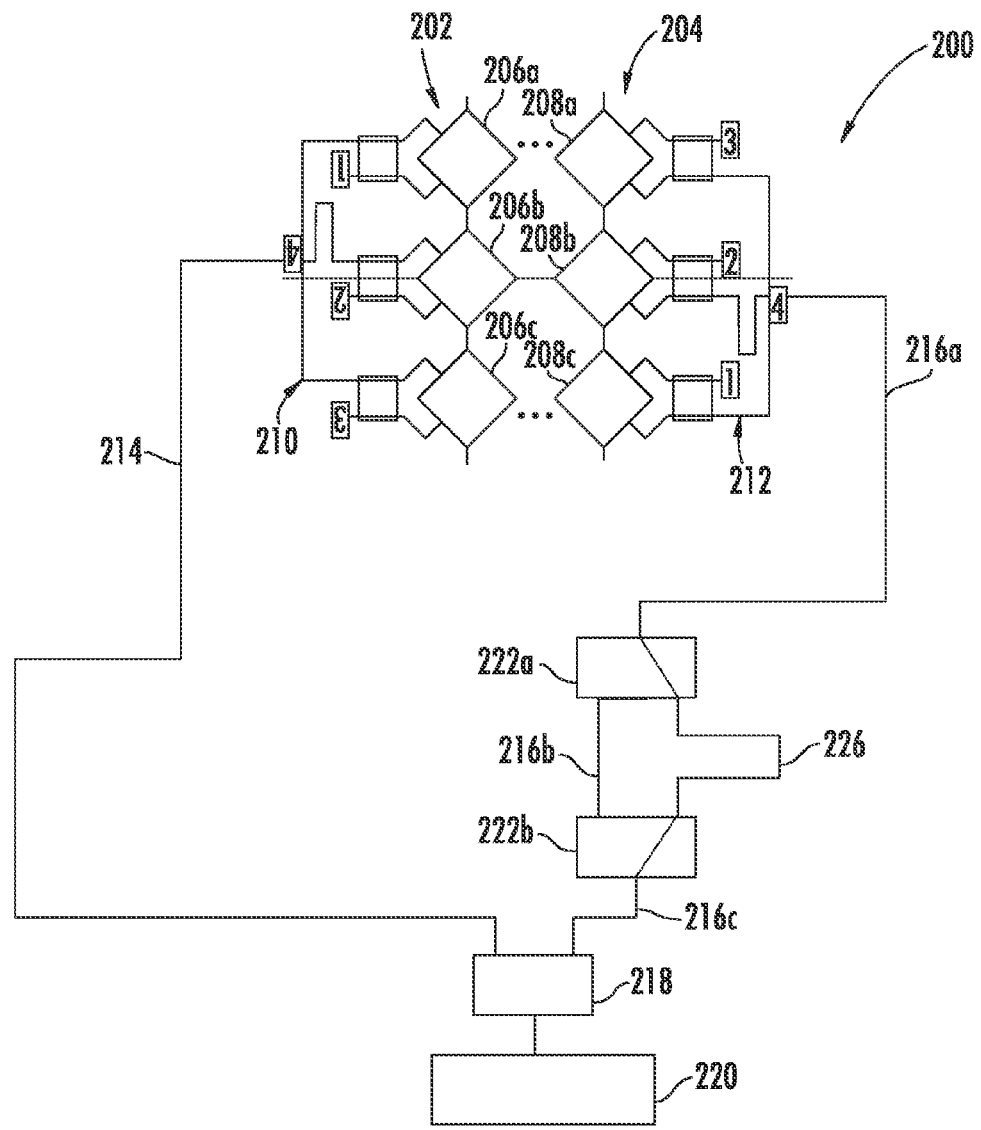
FIG. 12 is a schematic representation of the patch antenna of FIG. 11 illustrating the operation of a switch contained therein.

FIGS. 11 and 12 illustrate a variation of bottom antenna 200 described above with reference to FIG. 10. In one embodiment, and referring to FIG. 11, bottom antenna 200 is identical in construction and operation to the bottom antenna of FIG. 10, except for the addition of a switch 222. Feed line 216 has been segmented by a first portion 222a and a second portion 222b of switch 222, such that segment 216a connects feed network 212 to first portion 222a, segment 216b interconnects switch portions 222a and 222b, and segment 216c connects switch portion 222b to power splitter 218. Switch portions 222a and 222b are also interconnected by an additional feed line 226.

Still referring to FIG. 11, antenna engine 220 supplies an RF signal to power splitter 218, which evenly splits the signal between feed lines 214 and segment 216c. Feed line 214 supplies the drive signal to feed network 210. FIG. 11 illustrates switch 222 in a "first" position, such that segments 216c, 216b, and 216a are connected. As a result, the signal supplied to segment 216c is supplied to feed network 212 via segments 216b and 216a. Operation of antenna 200 is otherwise identical to that described above with respect to the antenna illustrated by FIG. 10. As a result, bottom antenna 200 produces a radiation pattern identical to pattern 198 exemplified in FIG. 9.

FIG. 12 illustrates switch 222 in a "second" position so that feed line 226 (instead of segment 216b) connects segment 216a on one side to segment 216c on the other. As a result, the signal supplied to segment 216c is supplied to feed network via segment 216a and feed line 226. The length of feed line 226 is equal to the length of segment 216b plus a length that corresponds to a half wavelength of the signal supplied by antenna engine 220. Thus, the signal supplied to feed network 212 is shifted 180° as compared to the signal supplied to feed network 210 due to the increased distance traveled by the signal because of the inclusion of feed line 226. Feed networks 210 and 212 receive the respective signals and supply them to patch elements 206 and 208. As set forth above with reference to FIG. 10, the signals emitted by patch elements 208 are 180° out of phase as compared to the signals transmitted by patch elements 206 because the signals are supplied to the opposite sides of patch elements 208 as compared to the application of the signals to patch elements 206. Due to the additional length of feed line 226, however, the signals emitted by patch elements 208 are shifted another 180°. As a result, the signals emitted by patch elements 208 are in phase with the signals transmitted by patch elements 306. Thus, bottom antenna 200 as shown in FIG. 12 produces a radiation pattern similar to radiation pattern 228 as exemplified in FIG. 13.

Figure 13:
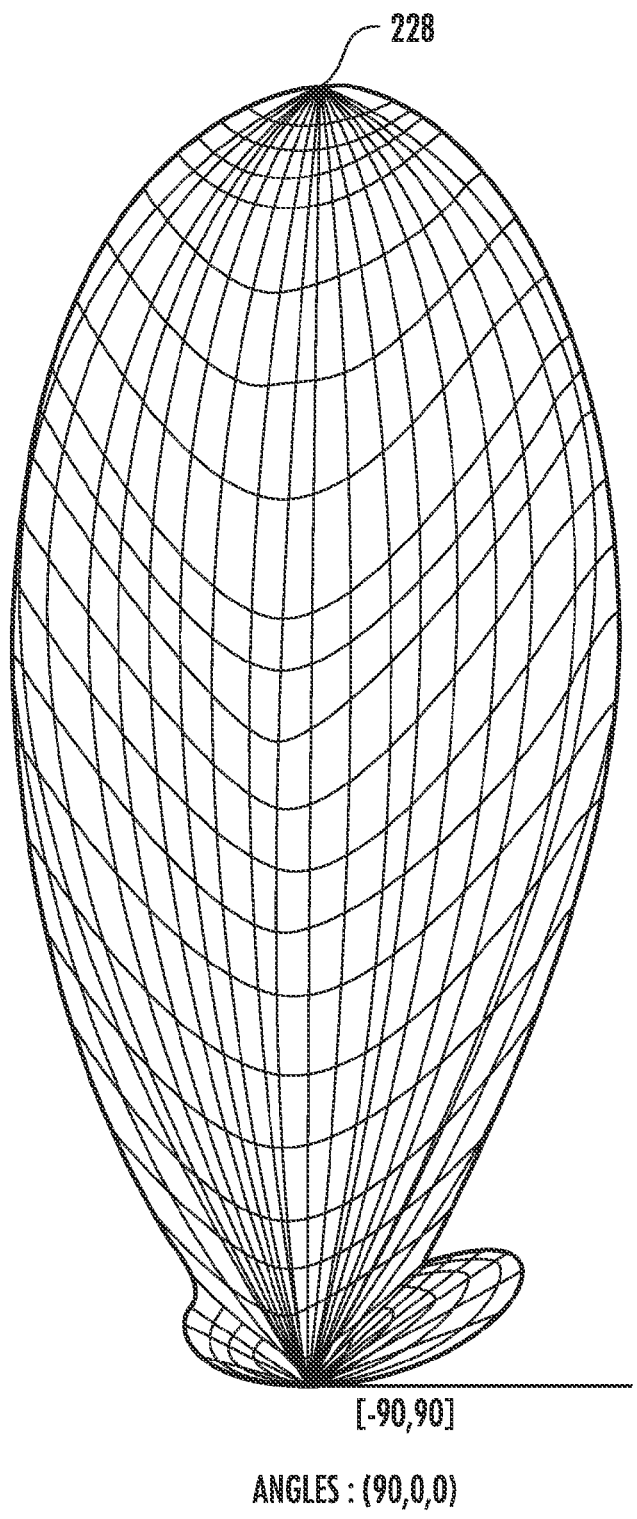
FIG. 13 is a graphic representation of a radiation pattern produced by the patch antenna of FIG. 12.

Referring to FIGS. 1A, 12, and 13, radiation pattern 228 exhibits one relatively large lobe that extends mostly in the Z direction (vertically above conveyor belt 14) with minimal variance in the Y direction (in the direction of the length of the belt). Thus, when bottom antenna 200 as shown in FIG. 12 is placed below conveyor belt 14 with switch 222 in the second position, the antenna emits radiation pattern 228 covering an area directly over the conveyor without extending a substantial amount in the direction of travel 22. In comparison, radiation pattern 228 is relatively narrower than radiation pattern 198 (FIG. 9) and also does not generally extend in the upstream or downstream direction, unlike radiation pattern 198. Radiation pattern 228 may be preferable in RFID systems designed to associate an RFID tag to a specific package on which the tag is located due to the relatively narrow radiation pattern. This is because pattern 228 reduces the likelihood of receiving signals from RFID tags located upstream or downstream from the package passing through the electromagnetic field radiated by bottom antenna 200.

It should be understood that use of switch 222 as shown in FIGS. 11 and 12 allows system 10 (FIG. 1A) or a user to manipulate the phase of the signals applied to the patch elements of an antenna and, thus, manipulate the electromagnetic field radiated by the antenna. Additionally, the electromagnetic field of the emitted signals may be manipulated by varying the length of the feed lines, such as feed line 226. A switch may be connected to feed line 214 in order to vary the phase of the signal applied to feed network 210, or multiple switches may be applied to feed lines 214 and 216 to allow various shifts in phase of the signals provided to patch elements 206 and 208. Thus, any various differences in phase between the signals transmitted by patch elements 206 and the signals transmitted by patch elements 208 can be created in order to vary the size and shape of the radiation pattern produced by bottom antenna 200.

It should be apparent from the above description that the radiation pattern of bottom antenna 200 can be changed dynamically as well. Thus, in another embodiment with reference to FIGS. 1A and 12, information received from photodetector 28 and TAC 24 is used to calculate the distance between consecutive packages. The distance between consecutive packages is the distance in TAC pulses between the trailing edge of one package and the front edge of the subsequent package as determined from data provided by photodetector 28 and TAC 24. This information is used to dynamically adjust the electromagnetic field radiated by bottom antenna 200 as shown in FIGS. 9 and 13 depending on the distance between the adjacent packages in path 22. For example, when there is a substantial distance between adjacent packages, system 10 sets switch 222 to the first position so that bottom antenna 200 produces radiation pattern 198 (FIG. 9), allowing the antenna to send and receive signals to and from a relatively large area. When the distance between adjacent packages is relatively small, however, system 10 sets switch 222 to the second position so that bottom antenna 200 emits radiation pattern 228 (FIG. 13). The system sets switch 222 based on the data received from tracking thread 70, which includes information regarding the distance between adjacent packages and the location of each package as measured by TAC pulses. Thus, as a given package approaches the bottom antenna, the system sets switch 222 appropriately based on the location of that package and the distance between that package and any adjacent packages as determined from data acquired as the package and adjacent packages passed photodetector 28. In an exemplary embodiment, if the distance between adjacent packages traveling on the conveyor is greater than 24 inches, system 10 sets switch 222 to the first position so that antenna 200 radiates antenna pattern 198.

Additionally, system 10 may select the switch position based on the speed of the conveyor. For instance, in a conveyor system where the conveyor moves relatively slowly, system 10 may set switch 222 to the first position, whereas system 10 may set the switch to the second position in a system where the conveyor moves at a relatively high rate of speed. Thus, system 10 may alter the size of the antenna's electromagnetic field in order to reduce the likelihood of receiving a signal from an RFID tag located upstream or downstream from the package passing directly over the antenna.

Furthermore, it should be apparent that the above process may be used to change the intended purpose of the tracking system. In other words, when system 10 is to be used as a portal system in order to confirm specific packages are within the system, bottom antenna 200 as shown in FIG. 11 may be used, while bottom antenna 200 as shown in FIG. 12 may be used when the system is to be used as an RFID system that allocates RFID tags to specific packages in order to track the packages and direct them to a particular location. Thus, a user may selectively alter switch 222 to the desired position based on the currently preferred use of the system.

Referring to FIG. 5A, device 47 provides a drive signal to patch elements 122 via feed lines 124 and feed networks 130 as describe above. In another embodiment, device 47 additionally provides a second signal to patch elements 122. This second signal is created by phase-shifting the drive signal approximately 180°. As a result, the side beams (or "lobes") of the resulting electromagnetic field increase in size as compared to the typical field radiated by patch elements 122. This allows antenna 40 to send and receive signals to and from RFID tags farther upstream and downstream in relation to the antenna's midpoint. Therefore, due to the increased size of the antenna's radiation pattern, the antenna is configured to receive a greater number of responses from each RFID tag that passes through the antenna's radiated field. Device 47 otherwise operates in a manner identical to that described above with respect to any signals received by patch elements 122. Consequently, additional responses from an RFID tag enable device 47 to output additional sum and difference signals to computer 26 for analysis. These additional signals allow computer 26 and tracking thread 70 to more precisely determine the direction that the transmitting RFID tag is moving with respect to the antenna's midpoint. Alternatively, these additional signals allow tracking system 70 to more accurately determine the location of a null within the difference signals received from device 47 so that the assignment of the corresponding RFID to a package has a higher confidence rating as set forth above.

Increasing the side lobes of the electromagnetic field radiated by an antenna may cause additional concerns, however, such as creating interference or crosstalk between the antennas. As described above, antennas 36, 38, 40, and 42 of RFID tunnel 34 (FIG. 1A) may be separated and are located at specific intervals along conveyor system 10 so that each antenna's radiation pattern does not overlap that of any other antenna. As a result, potential interference or crosstalk among the antennas is effectively eliminated or reduced. It should be understood that other reasons for separating the antennas located within tunnel 34 along belt 14 are contemplated by the present invention. For example, separating the antennas allows each antenna to constantly send and receive RF signals in an attempt to communicate with nearby RFID tags without causing or being susceptible to interference to or with the electromagnetic fields radiated by the other antennas. The antennas otherwise communicate with RFID tags affixed to packages transported by system 10 and analyze any responsive signals in a manner consistent to that described above.

Referring again to FIG. 1A, it should be understood by one of ordinary skill in the art that the number and placement of antennas along conveyor system 10 may vary depending on the configuration and size of the system without departing from the scope of the present invention. For example, additional antennas similar in operation and construction to those described above may be added along conveyor system 10 at predetermined positions in order to provide computer 26 with additional data received from any RFID tag passing through the respective radiation pattern of each antenna. These additional antennas may be located along conveyor belt 14 at positions sufficiently spaced apart in order to prevent the electromagnetic field of one antenna from overlapping that of another. It should be understood by one of ordinary skill in the art that the number, location, and type (e.g., antennas with or without a sum/difference configuration) of any additional antennas added to conveyor system 10 will depend upon certain factors of the system, such as the length and speed of conveyor belt 14.

The antenna engines described above may be connected to computer 26 using Ethernet network connections. Specifically, twisted-pair cables connect the engines with computer 26 and are used to transmit information back and forth between the devices, including the RF signals and responses described above. Additionally, power can be supplied to the antenna engines via these Ethernet cables. This arrangement is referred to as "power over Ethernet" or "PoE." It should be apparent that PoE may be employed to reduce the number of physical cables or connections attached to the antenna engine because both information, in the form of signals, and power are transferred to the antenna engine through one connection. Additionally, supplying both power and data to an antenna engine via Ethernet cables may be employed regardless of whether the antenna engine is a separate device or whether it is enclosed within the housing of the respective antenna.

Additionally, the antenna engines described above may be affixed directly to the back surface of the corresponding antenna, thus reducing the distance between the antenna engine and the antenna. A reduction in distance between these two components also lessens the amount or length of the physical connections required to link the engine to the antenna. In most cases, such a reduction is more economical and efficient compared to an antenna engine located remotely with respect to its associated antenna.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for processing items on which radio frequency identification tags are disposed, comprising:
    providing a conveyor that conveys items through a path of travel, each item having at least one respective radio frequency identification tag disposed thereon;
    providing an antenna disposed proximate the path of travel, wherein the antenna comprises at least one first element and at least one second element, and wherein the at least one first element is disposed upstream from the at least one second element with respect to the path of travel;
    radiating radio frequency signals into the path of travel from the antenna and receiving, at the antenna, responses to the radio frequency signals from radio frequency identification tags disposed on the items being conveyed by the conveyor through the path of travel;
    at circuitry that is in communication with the conveyor, receiving signals from the at least one first element and the at least one second element corresponding to the responses;
    at the circuitry, determining a difference between magnitude of a said signal corresponding to the response from the at least one first element and magnitude of a said signal corresponding to the response from the at least one second element; and
    at the circuitry, associating information corresponding to a said radio frequency tag with a said item based upon when the difference reaches a minimum.

2. A method for processing items on which radio frequency identification tags are disposed, comprising:
    providing a conveyor that conveys items through a path of travel, each item having at least one respective radio frequency identification tag disposed thereon;
    providing a sensor disposed proximate the path of travel so that the sensor detects presence of items in the path of travel;
    providing an antenna disposed proximate the path of travel so that the antenna radiates radio frequency signals into the path of travel, including to a predetermined position in the path of travel, wherein the antenna comprises at least one first element and at least one second element, and wherein the at least one first element is disposed upstream from the at least one second element with respect to the path of travel;
    radiating radio frequency signals into the path of travel, including the predetermined position, from the antenna and receiving, at the antenna, responses to the radio frequency signals from radio frequency identification tags disposed on the items being conveyed by the conveyor through the path of travel;
    at circuitry that is in communication with the conveyor, receiving signals from the at least one first element and the at least one second element corresponding to the responses;
    at the circuitry, determining a difference between magnitude of a said signal corresponding to the response from the at least one first element and magnitude of a said signal corresponding to the response from the at least one second element,
    wherein the antenna is disposed with respect to the path of travel so that the difference is at a minimum when the radio frequency identification tag from which the at least one first element and the at least one second element receive the responses is at the predetermined position; and at the circuitry, associating information corresponding to a said radio frequency identification tag with a said item based upon proximity of the item to the predetermined position when the difference reaches the minimum.

3. The method as in claim 2, comprising receiving, at the circuitry, said signals from the at least one first element and the at least one second element correspondingly to responses from radio frequency identification tags at a plurality of positions in the path of travel, and identifying, for an individual said radio frequency identification tag, a said minimum corresponding to the individual radio frequency identification tag.

4. The method as in claim 3, wherein the identifying step comprises identifying the minimum for the individual radio frequency identification tag after a first period of time without receiving a said signal from the at least one first element or the at least one second element correspondingly to a response from the individual radio frequency identification tag after having received said signals from the at least one first element or the at least one second element correspondingly to responses from the individual radio frequency identification tag.

5. The method as in claim 3, wherein the identifying step comprises identifying a plurality of local minima in the difference corresponding to the individual radio frequency identification tag and identifying a minimum of the local minima as the minimum of the difference corresponding to the individual radio frequency identification tag.

6. The method as in claim 4, comprising determining, at the circuitry, a second period between occurrence of the minimum of the difference corresponding to the individual radio frequency identification tag and expiration of the first period, determining a position of each item with respect to the path of travel at the expiration of the first period, discounting a present position of each item in the path of travel by the second period, and comparing the discounted present position of each item with the predetermined position to thereby determine a proximity of each item to the predetermined position.

7. The method as in claim 2, comprising associating, at the circuitry, the information with a said item based upon whether the item is at the predetermined position when the difference reaches the minimum.

8. The method as in claim 3, comprising identifying a first position in the path of travel at which a said signal is received from the at least one first element and the at least one second element correspondingly to a response from the individual radio frequency identification tag prior to occurrence of the minimum and identifying a second position in the path of travel at which a said signal is received from the at least one first element and the at least one second element correspondingly to a response from the individual radio frequency identification tag after occurrence of the minimum, based on identification of the minimum and movement of the conveyor.

9. The method as in claim 8, comprising associating the information with a said item based upon whether the item is between the first position and the second position when the magnitude of the difference reaches the minimum.

10. The method as in claim 8, comprising associating the information with a said item based upon whether the item is within a predetermined distance of the first position and a predetermined distance of the second position when the difference reaches the minimum.

11. The method as in claim 2, comprising providing a device in communication with the conveyor that outputs signals corresponding to conveyor position, and receiving, at the circuitry, the signals corresponding to conveyor position and tracking a position of each item with respect to the path of travel based thereon following detection of the presence of said each item in the path of travel by the sensor disposed proximate the path of travel.

12. The method of claim 11, wherein the device is a tachometer.

13. The method as in claim 11, comprising, upon receipt of the signals from the at least one first element and the at least one second element correspondingly to a said response from an individual radio frequency identification tag, storing the information corresponding to the individual radio frequency identification tag in association with data corresponding to conveyor position from the sensor in communication with the conveyor.

14. A method for processing items on which radio frequency identification tags are disposed, comprising:

providing a conveyor that conveys items through a path of travel, each item having at least one respective radio frequency identification tag disposed thereon;

providing a sensor disposed proximate the path of travel so that the sensor detects presence of items in the path of travel;

providing an antenna disposed proximate the path of travel so that the antenna radiates radio frequency signals into the path of travel, including to a predetermined position in the path of travel, wherein the antenna comprises at least one first element and at least one second element, and wherein the at least one first element is disposed upstream from the at least one second element with respect to the path of travel;

radiating radio frequency signals into the path of travel, including the predetermined position, from the antenna and receiving, at the antenna, responses to the radio frequency signals from radio frequency identification tags disposed on the items being conveyed by the conveyor through the path of travel;

at circuitry that is in communication with the conveyor, receiving signals from the at least one first element and the at least one second element corresponding to the responses, wherein, for respective said responses, a first magnitude corresponds to a difference between magnitude of a said signal corresponding to the response from the at least one first element and magnitude of a said signal corresponding to the response from the at least one second element, and a second magnitude corresponds to a sum of the magnitude of the signal from the at least one first element and the magnitude of the signal from the at least one second element;

at the circuitry, for respective instances of said signals from the at least one first element and the at least one second element, determining a first difference between the first magnitude and the second magnitude;

at the circuitry, for respective instances of said signals from the at least one first element and the at least one second element received correspondingly to responses from an individual radio frequency identification tag, determining a second difference between the first difference for each said correspondingly received respective instance and the first difference from a preceding said correspondingly received respective instance, wherein the antenna is disposed with respect to the path of travel so that the first magnitude is at a minimum when the radio frequency identification tag from which the at least one first element and the at least one second element receive the responses is at the predetermined position and the second magnitude is at a maximum when the radio frequency identification tag from which the at least one first element and the at least one second element receive the responses is at the predetermined position; and at the circuitry, monitoring the first and second magnitudes and associating information corresponding to the individual radio frequency identification tag with a said item based upon change in polarity of the second difference.

* * * * *